(12) United States Patent
Byun et al.

(10) Patent No.: US 10,770,990 B2
(45) Date of Patent: Sep. 8, 2020

(54) TRIBOELECTRIC GENERATOR

(71) Applicants: Samsung Electronics Co., Ltd., Suwon-si, Gyeonggi-do (KR); UNIST (ULSAN NATIONAL INSTITUTE OF SCIENCE AND TECHNOLOGY), Ulsan (KR)

(72) Inventors: Kyungeun Byun, Seongnam-si (KR); Jaeyoung Kim, Suwon-si (KR); Minsu Seol, Suwon-si (KR); Hyeonjin Shin, Suwon-si (KR); Jeongmin Baik, Ulsan (KR); Woojung Yang, Incheon (KR); Byeonguk Ye, Daegu (KR); Jaewon Lee, Gangneung-si (KR); Jinpyo Lee, Gongju-si (KR); Kyeongnam Kim, Jeju-si (KR)

(73) Assignees: Samsung Electronics Co., Ltd., Gyeonggi-do (KR); UNIST (Ulsan National Institute of Science and Technology), Ulsan (KR)

( * ) Notice: Subject to any disclaimer, the term of this patent is extended or adjusted under 35 U.S.C. 154(b) by 520 days.

(21) Appl. No.: 15/589,091

(22) Filed: May 8, 2017

(65) Prior Publication Data
US 2017/0331396 A1    Nov. 16, 2017

(30) Foreign Application Priority Data

May 10, 2016  (KR) .......................... 10-2016-0057217
May 10, 2016  (KR) .......................... 10-2016-0057218

(51) Int. Cl.
*H02N 1/04*  (2006.01)

(52) U.S. Cl.
CPC ..................................... *H02N 1/04* (2013.01)

(58) Field of Classification Search
CPC ....................................................... H02N 1/04
(Continued)

(56) References Cited

U.S. PATENT DOCUMENTS

| 7,578,580 B2 | 8/2009 | Ito et al. |
| 8,519,596 B1 | 8/2013 | Kim et al. |

(Continued)

FOREIGN PATENT DOCUMENTS

| CN | 103023371 A | 4/2013 |
| CN | 103684035 A | 3/2014 |

(Continued)

OTHER PUBLICATIONS

Wang, Machine Translation of WO2015003497, Jan. 2015 (Year: 2015).*

(Continued)

*Primary Examiner* — Quyen P Leung
*Assistant Examiner* — Eric Johnson
(74) *Attorney, Agent, or Firm* — Harness, Dickey & Pierce, P.L.C.

(57) ABSTRACT

A triboelectric generator includes a first electrode and a second electrode spaced apart from each other, a first charging part on the first electrode, a second charging part on the second electrode, and a grounding unit. The first charging part and the second charging part may be configured to contact each other through a sliding motion. The grounding unit may be configured to intermittently connect a charge reservoir to the second charging part. The grounding unit may be configured to vary the electric potential of the second charging part so as to amplify current flowing between electrodes of the triboelectric generator.

15 Claims, 42 Drawing Sheets

(58) Field of Classification Search
USPC .................. 310/300, 308, 309, 310; 318/116; 322/2 A See application file for complete search history.

(56) References Cited

U.S. PATENT DOCUMENTS

| | | | |
|---|---|---|---|
| 9,178,446 | B2 | 11/2015 | Wang et al. |
| 9,812,993 | B2 | 11/2017 | Wang et al. |
| 2002/0047492 | A1 | 4/2002 | Jones |
| 2009/0061663 | A1 | 3/2009 | Chang |
| 2013/0049531 | A1 | 2/2013 | Wang et al. |
| 2013/0057110 | A1 | 3/2013 | Aoyagi et al. |
| 2014/0084748 | A1 | 3/2014 | Wang et al. |
| 2014/0246950 | A1 | 9/2014 | Wang et al. |
| 2014/0246951 | A1 | 9/2014 | Wang et al. |
| 2015/0097465 | A1 | 4/2015 | Karagozler et al. |
| 2015/0311823 | A1 | 10/2015 | Wang et al. |
| 2015/0372620 | A1 | 12/2015 | Zhang et al. |
| 2016/0028327 | A1 | 1/2016 | Aliane |
| 2016/0105538 | A1 | 4/2016 | Olah et al. |
| 2016/0149518 | A1 | 5/2016 | Wang et al. |
| 2016/0218640 | A1 | 7/2016 | Wang et al. |
| 2017/0063256 | A1 | 3/2017 | Wu et al. |
| 2017/0317611 | A1* | 11/2017 | Baik .................. H02N 1/08 |
| 2017/0331396 | A1 | 11/2017 | Byun et al. |
| 2017/0331397 | A1* | 11/2017 | Kim .................. H02N 1/04 |
| 2018/0013358 | A1 | 1/2018 | Turng et al. |

FOREIGN PATENT DOCUMENTS

| | | |
|---|---|---|
| CN | 103780132 A | 5/2014 |
| CN | 105099260 A | 11/2015 |
| CN | 105337526 A | 2/2016 |
| JP | 2017219420 A | 12/2017 |
| KR | 10-1743674 B1 | 5/2017 |
| WO | WO-2014082561 A1 | 6/2014 |
| WO | WO2015003497 * | 1/2015 |
| WO | WO-2016076621 A2 | 5/2016 |

OTHER PUBLICATIONS

Zi et al., Effective Energy Storage From a Triboelectric Nanogenerator, Mar. 2016 (Year: 2016).*

Cheng et al., Pulsed Nanogenerator With Huge Instantaneous Output Power Density,Jul. 2013 (Year: 2013).*

Yang, et al. "Single-Electrode-Based Sliding Triboelectric Nanogenerator for Self-Powered Displacement Vector Sensor System," ACS Nano, vol. 7, No. 8, pp. 7342-7351 (2013).

Huang, et al. "Enhanced Power Output of a Triboelectric Nanogenerator Composed of Electrospun Nanofiber Mats Doped with Graphene Oxide," Scientific Reports, pp. 1-8, (2015).

Bhavanasi, et al. "Enhanced Piezoelectric Energy Harvesting Performance of Flexible PVDF-TrFE Bilayer Films with Graphene Oxide," ACS Applied Materials & Interfaces, vol. 8, pp. 521-529 (2016).

Wang, et al. "Freestanding Triboelectric-Layer-Based Nanogenerators for Harvesting Energy from a Moving Object or Human Motion in Contact and Non-contact Modes," Advanced Materials, vol. 26, pp. 2818-2824 (2014).

Wang, et al. "Sliding-Triboelectric Nanogenerators Based on In-Plane Charge-Separation Mechanism," Nano Letters, vol. 13, pp. 2226-2233 (2013).

Zhu, et al. "Radial-arrayed rotary electrification for high performance triboelectric generator," Nature Communications, pp. 1-9, (2014).

Guo, et al. "A Water-Proof Triboelectric-Electromagnetic Hybrid Generator for Energy Harvesting in Harsh Environments," Advanced Energy Materials, 1501593, pp. 1-7 (2015).

Guo, et al. "Spiral-interdigital-electrode-based multifunctional device: Dual-functional triboelectric generator and dual-functional self-powered sensor," Nano Energy, vol. 12, pp. 626-635 (2015).

Zhu, et al. "Toward Large-Scale Energy Harvesting by a Nanoparticle-Enhanced Triboelectric Nanogenerator," Nano Letters, vol. 13, pp. 847-853 (2013).

Zhu, et al. "A Shape-Adaptive Thin-Film-Based Approach for 50% High-Efficiency Energy Generation Through Micro-Grating sliding Electrification," Advanced Matericals, vol. 26, pp. 3788-3796 (2014).

Extended European Search Report dated Oct. 19, 2017 issued in corresponding European Application No. 17168266.9.

Extended European Search Report dated Oct. 19, 2017 for European Application No. 17170444.8.

Office Action dated Mar. 20, 2010, issued in co-pending U.S. Appl. No. 15/498,897.

Office Action dated Oct. 25, 2019, issued in corresponding Chinese Patent Application No. 201710303449.9.

U.S. Appl. No. 15/498,897, filed Apr. 27, 2017.

Office Action dated Jul. 20, 2020, issued in co-pending U.S. Appl. No. 15/498,897.

* cited by examiner

TRIBOELECTRIC GENERATOR

CROSS-REFERENCE TO RELATED APPLICATIONS

This application claims the benefit of Korean Patent Application Nos. 10-2016-0057217, filed on May 10, 2016, and 10-2016-0057218, filed on May 10, 2016, in the Korean Intellectual Property Office, the entire disclosures of which are incorporated herein by reference.

BACKGROUND

1. Field

The present disclosure relates to triboelectric generators, and more particularly, to triboelectric generators having grounding structures.

2. Description of Related Art

Recently, there is increasing interest in energy harvesting techniques. Energy harvesting devices capable of converting energy of surroundings such as mechanical energy of wind, vibration, or human body motion into electric energy and extracting the electric energy may be considered as new eco-friendly energy generating devices.

Triboelectric generators are energy harvesting devices configured to generate electric energy using a charge transfer phenomenon occurring when two charging parts rub together. Triboelectric generators have a high degree of energy conversion efficiency, and thus if triboelectric generators are used, a high degree of output may be obtained even by a small amount of force. In addition, triboelectric generators do not have time or spatial limitations compared to energy harvesting devices using heat or sunlight, and it is possible to continuously generate electric energy using triboelectric generators unlike the case of using piezoelectric energy harvesting devices configured to generate electric energy by deforming a piezoelectric material.

SUMMARY

Some example embodiments provide triboelectric generators including grounding structures.

Additional aspects will be set forth in part in the description which follows and, in part, will be apparent from the description, or may be learned by practice of the presented embodiments.

According to some example embodiments, a triboelectric generator includes a first electrode and a second electrode spaced apart from each other, a first charging part and a second charging part, and a grounding unit. The first charging part is on the first electrode. The first charging part is configured to be charged a first polarity due to contact with the second charging part. The second charging part is configured to slide on a surface of the first charging part. The second charging part is configured to charge a second polarity that is opposite the first polarity through contact with the first charging part. The grounding unit is configured to intermittently connect the second charging part to a charge reservoir according to movement of the second charging part.

In some example embodiments, the second charging part may be configured to slide on a surface of the second electrode as well as on the surface of the first charging part.

In some example embodiments, the first electrode and the second electrode may be spaced apart from each other in a direction in which the second charging part is configured to slide.

In some example embodiments, the first charging part may be on an upper surface of the first electrode, and the upper surface of the first electrode may face the second charging part.

In some example embodiments, the grounding unit may be between the first electrode and the second electrode, and the second charging part may be configured to slide on an upper surface of the grounding unit.

In some example embodiments, a distance between the first charging part and the grounding unit may be less than a width of the second charging part, and a distance between the second electrode and the grounding unit may be less than the width of the second charging part.

In some example embodiments, the first electrode, the grounding unit, and the second electrode may be on a first substrate.

In some example embodiments, the first substrate has a cylindrical shape or a circular post shape.

In some example embodiments, the triboelectric generator may further include a second substrate having a cylindrical shape surrounding the first substrate, and the second charging part may be on an inner surface of the second substrate.

In some example embodiments, the first substrate may have a circular plate shape, and the first electrode, the grounding unit, and the second electrode may be arranged on the first substrate in radial directions.

In some example embodiments, the triboelectric generator may further include a second substrate having a circular plate shape facing the first substrate, and the second charging part may be on the second substrate.

In some example embodiments, the second charging part may be configured to slide on the first charging part while rotating relative to the first charging part, and the first electrode and the second electrode may be spaced apart from each other in a direction perpendicular to a direction in which the second charging part is configured to slide.

In some example embodiments, the first charging part may be on a lower surface of the first electrode facing the second charging part.

In some example embodiments, the grounding unit may be electrically connected to the charge reservoir, and the grounding unit may include a conductive post configured to intermittently contact the second charging part when the second charging part rotates.

In some example embodiments, the grounding unit may include a conductive member and an insulative member alternately arranged in a direction in which the second charging part rotates, and the conductive member may be electrically connected to the charge reservoir and configured to intermittently contact the second charging part.

In some example embodiments, the first charging part, the second charging part, and the second electrode may have a fan shape.

In some example embodiments, the triboelectric generator may further include: a first magnetic part below the first electrode; and a second magnetic part above the second electrode.

In some example embodiments, the second electrode may be configured to be moved relative to the second charging part by magnetic force between the first magnetic part and the second magnetic part, and mutually-facing surfaces of the first magnetic part and the second magnetic part may have a same polarity.

In some example embodiments, the first magnetic part may be interlocked with the first electrode and the first charging part.

In some example embodiments, a lower surface of the second charging part may be configured to contact an upper surface of the first charging part while the second charging part rotates relative to the first charging part.

In some example embodiments, the first electrode, the first charging part, the grounding unit, and the first magnetic part may be configured to interlock with each other and to rotate relative to the second charging part.

In some example embodiments, the second electrode and the second charging part may be configured to contact each other or to separate from each other depending on a distance between the first magnetic part and the second magnetic part.

In some example embodiments, the second electrode interlocked with the second magnetic part may be configured to contact an upper surface of the second charging part when the first charging part and the second charging part contact each other.

In some example embodiments, the first charging part may be configured to be charged with a negative charge, and the second charging part may be configured to be charged with a positive charge.

In some example embodiments, the first charging part may be charged with a positive charge, and the second charging part may be charged with a negative charge.

In some example embodiments, the charge reservoir may include a ground or a conductive member.

According to some example embodiments, a triboelectric generator may include a first electrode, a first charging part on the first electrode, a second electrode spaced apart from the first electrode, a second charging part configured to contact a surface of the first charging part through sliding motion, and a grounding unit configured to intermittently connect the second charging part to a charge reservoir according to movement of the second charging part. The first charging part may have a first charging rating. The first charging part may include a first material. The second charging part may have a second charging rating that is different than the first charging rating. The second charging part may include an electrically conductive material that is different than the first material.

In some example embodiments, the grounding unit may be between the first electrode and the second electrode, and the second charging part may be configured to slide on an upper surface of the grounding unit.

In some example embodiments, the first charging part may include at least one of an organic polymer, an inorganic polymer, an organically modified ceramic. The second charging part may include a metallic material.

In some example embodiments, the second charging part may be configured to slide on the first charging part while rotating relative to the first charging part, and the first electrode and the second electrode may be spaced apart from each other in a direction perpendicular to a direction in which the second charging part is configured to slide.

In some example embodiments, a distance between the first charging part and the grounding unit may be less than a width of the second charging part, and a distance between the second electrode and the grounding unit may be less than the width of the second charging part.

BRIEF DESCRIPTION OF THE DRAWINGS

These and/or other aspects will become apparent and more readily appreciated from the following description of non-limiting embodiments, taken in conjunction with the accompanying drawings in which.

DETAILED DESCRIPTION

Figure 1:
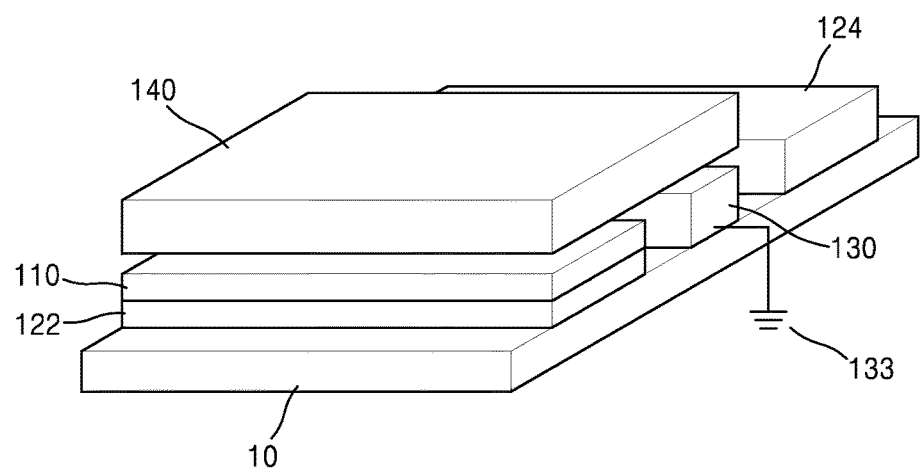
FIG. 1 is a perspective view illustrating a triboelectric generator according to some example embodiments.

Reference will now be made in detail to some example embodiments illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are general terms currently widely used in the art in consideration of functions regarding inventive concepts, but the terms may vary according to the intention of those of ordinary skill in the art, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

In the following descriptions of embodiments, when a portion or element is referred to as being connected to another portion or element, the portion or element may be directly connected to the other portion or element, or may be electrically connected to the other portion or elements with intervening portions or elements being therebetween. It will be further understood that the terms "comprises" and/or "comprising" used herein specify the presence of stated features or elements, but do not preclude the presence or addition of one or more other features or elements. In the descriptions of the embodiments, terms such as unit or module are used to denote a unit having at least one function or operation and implemented with hardware, software, or a combination of hardware and software.

In the following descriptions of the embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

In addition, although the terms "first" and "second" are used to describe various elements, these elements should not be limited by these terms. These terms are only used to distinguish one element from other elements.

The following descriptions of the embodiments should not be construed as limiting the scope of inventive concepts, and modifications or changes that could be easily made from the embodiments by those of ordinary skill in the art should be construed as being included in the scope of inventive concepts. Hereinafter, example embodiments will be described with reference to the accompanying drawings.

Figure 2:
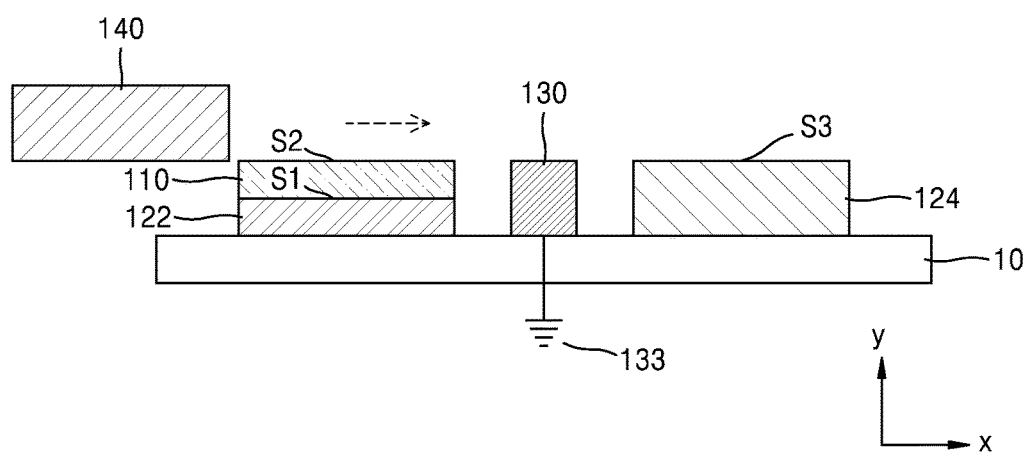
FIG. 2 is a cross-sectional view illustrating the triboelectric generator shown in FIG. 1.

FIG. 1 is a perspective view illustrating a triboelectric generator according to some example embodiments. FIG. 2 is a cross-sectional view illustrating the triboelectric generator shown in FIG. 1.

Referring to FIGS. 1 and 2, the triboelectric generator may include a first electrode 122 and a second electrode 124 spaced apart from each other, a first charging part 110 disposed on a surface 51 of the first electrode 122, a second charging part 140 slidable in a direction (x-axis direction) on a surface S2 of the first charging part 110 and a surface S3 of the second electrode 124, and a grounding unit 130 configured to intermittently connect the second charging part 140 to a charge reservoir 133 according to the movement of the second charging part 140. The triboelectric generator may include a sliding mechanism to induce a horizontal motion of the second charging part 140 relative to the first charging part 110 or the second electrode 124 by an externally applied force and thus to bring adjacent surfaces into contact with each other.

The second charging part 140 may rub on an upper surface of the first charging part 110 through a sliding motion. Here, the expression "the second charging part 140 slides" refers to that the second charging part 140 moves relative to the first charging part 110, the grounding unit 130, and the second electrode 124. Therefore, sliding of the second charging part 140 may occur as the second charging part 140 moves. In addition, sliding of the second charging part 140 may occur as the first charging part 110, the grounding unit 130, and the second electrode 124 move relative to the second charging part 140. In addition, the expression "the second charging part 140 slides in a direction" refers to that the second charging part 140 slides in a direction in which the first charging part 110, the grounding unit 130, and the second electrode 124 are arranged. Therefore, the movement of the second charging part 140 is not limited to straight movement.

The first charging part 110 may include a first material. The second charging part 140 may include a second material that is a different material than the first material. For example, the second charging part 140 and the first charging part 110 may include materials having different charging ratings. Therefore, if a surface of the second charging part 140 is rubbed against the surface S2 of the first charging part 110, the surface S2 of the first charging part 110 and the surface of the second charging part 140 may be charged with different polarities. The types of charges of the first charging part 110 and the second charging part 140 are dependent on materials of the first charging part 110 and the second charging part 140, for example, may be determined by relative positions of the materials of the first charging part 110 and the second charging part 140 in a triboelectric series.

For example, the surface S2 of the first charging part 110 may be charged with a negative charge by friction with the second charging part 140, and the surface of the second charging part 140 may be charged with a positive charge by friction with the first charging part 110. The second charging part 140 may include a conductive material for easy electric connection with the grounding unit 130. The conductive material may include a metallic material that is easily charged by friction, such as aluminum (Al), copper (Cu), gold (Au), or steel. In addition, the first charging part 110 may include at least one of polytetrafluoroethylene (Teflon), fluorinated ethylene propylene (FEP), poly(methyl methacrylate) (PMMA), polyvinylidene fluoride (PVDF), polycarbonate (PC), polyvinyl chloride (PVC), polyimide (Kapton), polypropylene (PP), polyethylene (PE), and polystyrene (PS) that are easily charged with a negative charge by friction with the conductive material of the second charging part 140. In addition, the first charging part 110 may include an organic polymer such as poly(methyl methacrylate) PMMA, polyethylene terephthalate (PET), polyetheretherketone (PEEK), cycloolefin copolymer (COC), or polytetrafluoroethylene (PTFE). The first charging part 110 may include an inorganic polymer such as polydimethylsiloxane (PDMS) or organically modified ceramic (ORMOCER). The above-listed materials are examples, and inventive concepts are not limited thereto.

In another example, the surface S2 of the first charging part 110 may be charged with a positive charge by friction with the second charging part 140, and the surface of the second charging part 140 may be charged with a negative charge by friction with the first charging part 110. The second charging part 140 may include a conductive material for easy electric connection with the grounding unit 130. The conductive material may include at least one of aluminum (Al), copper (Cu), gold (Au), and steel that are easily charged by friction. The first charging part 110 may include at least one of polyformaldehyde, ethylcellulose, polyamide, melamine formol, wool, silk, mica, and nylon that are easily charged with a positive charge by friction with the conductive material. The above-listed materials are examples, and inventive concepts are not limited thereto.

At least one of the first and second charging parts 110 and 140 may be doped with a p-type dopant or an n-type dopant so as to adjust charging characteristics of the surface thereof. Examples of a source of the p-type dopant may include ionic liquids such as $NO_2BF_4$, $NOBF_4$, or $NO_2SbF_6$; acidic compounds such as $HCl$, $H_2PO_4$, $CH_3COOH$, $H_2SO_4$, or $HNO_3$; and organic compounds such as dichlorodicyanoquinone (DDQ), oxone, dimyristoylphosphatidylinositol (DMPI), or trifluoromethanesulfoneimide. Other examples of the source of the p-type dopant may include $HPtCl_4$, $AuCl_3$, $HAuCl_4$, AgOTf (silver trifluoromethanesulfonate), $AgNO_3$, $H_2PdCl_6$, $Pd(OAc)_2$, and $Cu(CN)_2$.

Examples of a source of the n-type dopant may include a reduction product of a substituted or unsubstituted nicotinamide; a reduction product of a compound which is chemically bound to a substituted or unsubstituted nicotinamide; and a compound including at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Alternatively, the source of the n-type dopant may include a polymer such as polyethyleneimine (PEI). Alternatively, the n-type dopant may include an alkali metal such as potassium (K) or lithium (Li). The above-listed p-type dopant materials and n-type dopant materials are examples. That is, any other materials may be used as the p-type dopant and the n-type dopant.

The grounding unit 130 may be electrically connected to the charge reservoir 133. The charge reservoir 133 may include ground or a conductive member having substantially no variation in electric potential. When the second charging part 140 contacts the grounding unit 130, the charge reservoir 133 and the second charging part 140 may be electrically connected to each other through the grounding unit 130. If the second charging part 140 is connected to the charge reservoir 133 through the grounding unit 130, the electric potential of the second charging part 140 may become substantially equal to the electric potential of the charge reservoir 133.

The first and second electrodes 122 and 124 may be spaced apart from each other in a direction in which the second charging part 140 slides. The first and second electrodes 122 and 124 may include a material having a high degree of electric conductivity. For example, the first and second electrodes 122 and 124 may include at least one of graphene, carbon nanotube (CNT), indium tin oxide (ITO), a metal, and a conductive polymer. For example, the metal may include at least one of silver (Ag), aluminum (Al), copper (Cu), gold (Au), nickel (Ni), chromium (Cr), and platinum (Pt). However, the metal is not limited thereto. The first and second electrodes 122 and 124 may have a single-layer or multilayer structure.

Electrostatic induction may occur between the first and second electrodes 122 and 124 as the second charging part 140 slides. That is, while the second charging part 140 slides, charge may flow between the first and second electrodes 122 and 124 by electrostatic induction. The triboelectric generator may harvest energy from flow of charge between the first and second electrodes 122 and 124.

Figure 3:
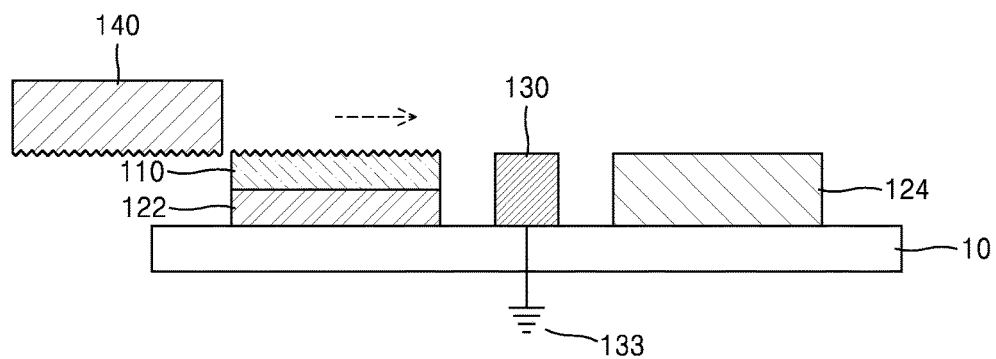
FIG. 3 is a view illustrating a modification of the triboelectric generator shown in FIG. 2.

FIG. 3 illustrates a modification of the triboelectric generator illustrated in FIGS. 1 and 2, according to some example embodiments. In the following description with reference to FIG. 3, the same descriptions as those given above with reference to FIGS. 1 and 2 will not be repeated.

Referring to FIG. 3, a plurality of protrusions may be formed on at least one of contact surfaces between the first charging part 110 and the second charging part 140. The protrusions may include nano-pyramids, nano-wires, nano-balls, nano-rods, or the like. Since the protrusions are formed on at least one of the contact surfaces between the first charging part 110 and the second charging part 140, when the first charging part 110 and the second charging part 140 are brought into contact with each other, the amount of charge induced on each of the contact surface of the first charging part 110 and the contact surface of the second charging part 140 may be increased.

Figure 4:
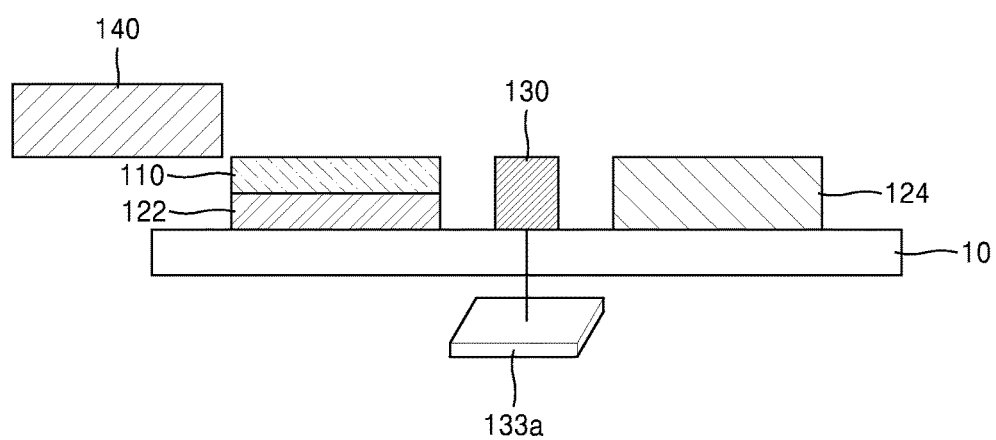
FIG. 4 is a view illustrating a modification of the triboelectric generator shown in FIG. 2.

FIG. 4 illustrates a modification of the triboelectric generator illustrated in FIGS. 1 and 2, according to some example embodiments.

Referring to FIG. 4, a charge reservoir may include a conductive member 131. In FIG. 4, the conductive member 133a has a plate shape. However, this is an example, and the conductive member 133a is not limited thereto. The charge reservoir may be a conductive member having a high degree of capacity. If the charge reservoir is connected to the second charging part 140 through the grounding unit 130, the charge reservoir may exchange charges with the second charging part 140. That is, the charge reservoir may vary the electric potential of the second charging part 140 by exchanging charges with the second charging part 140. For example, the electric potential of the charge reservoir may be substantially the same as the electric potential of ground.

Hereinafter, an energy harvesting process using the triboelectric generator illustrated in FIGS. 1 and 2 will be described.

Figure 5:
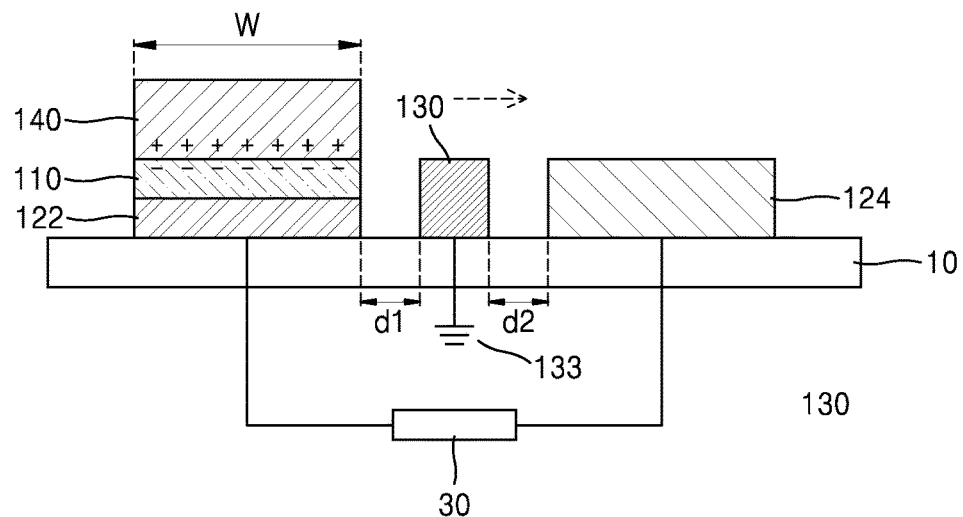
FIG. 5 is a view illustrating a sliding motion of a second charging part relative to a first charging part.

FIG. 5 is a view illustrating a state in which the second charging part 140 is moved relative to the first charging part 110 through a sliding motion. In the following description, charges illustrated in the drawings are examples. That is, there may be various flows of charge in triboelectric generators of various embodiments.

The first and second charging parts 110 and 140 are moved relative to each other. That is, sliding of the second charging part 140 may occur by the movement of the second charging part 140, the first charging part 110, or both the first and second charging parts 110 and 140. The first and second electrodes 122 and 124 and the grounding unit 130 may be arranged on a first substrate 10. The grounding unit 130 may be disposed between the first and second electrodes 122 and 124. While the second charging part 140 moves relative to the first substrate 10, the second charging part 140 may sequentially make contact with surfaces of the first charging part 110, the grounding unit 130, and the second electrode 124.

When the second charging part 140 and the first charging part 110 make contact with each other, the first and second charging parts 110 and 140 may be charged with opposite polarities. Referring to the example shown in FIG. 5, electrons move from the surface of the second charging part 140 to the surface of the first charging part 110 because of friction between the second charging part 140 and the first charging part 110. Owing to the movement of electrons, the second charging part 140 may be charged with a positive charge, and the first charging part 110 may be charged with a negative charge. However, this is merely an example. That is, the opposite case may also be possible. For example, electrons may move from the surface of the first charging part 110 to the surface of the second charging part 140, and thus the first charging part 110 may be charged with a positive charge and the second charging part 140 may be charged with a negative charge.

Figure 6:
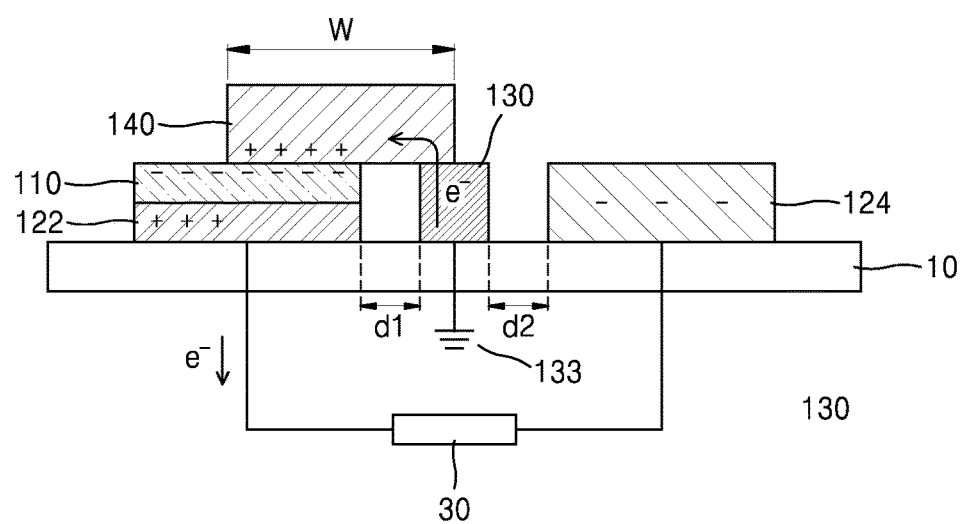
FIG. 6 is a view illustrating a state in which the second charging part meets a grounding unit as a result of a sliding motion.

FIG. 6 is a view illustrating a state in which the second charging part 140 meets the grounding unit 130 as a result of a sliding motion.

Referring to FIG. 6, the second charging part 140 may be brought into contact with an upper surface of the grounding unit 130 through a sliding motion. Since a portion of the upper surface of the first charging part 110 is not in contact with the second charging part 140, electrostatic induction may occur between the first and second electrodes 122 and 124. Electrons may move from the first electrode 122 to the second electrode 124 because of the electrostatic induction. While current flows between the first and second electrodes 122 and 124, electric energy may be harvested using a load 30 between the first and second electrodes 122 and 124.

The distance d1 between the first charging part 110 and the grounding unit 130 may be less than the width W of the second charging part 140. Here, the width W of the second charging part 140 refers to a length of the second charging part 140 in the sliding direction of the second charging part 140. Since the width W of the second charging part 140 is greater than the distance d1 between the first electrode 122 and the grounding unit 130, the second charging part 140 may contact both the first charging part 110 and the grounding unit 130 at the same time. Therefore, while current flows between the first and second electrodes 122 and 124 by electrostatic induction, electrons may be supplied to the second charging part 140 through the grounding unit 130, and thus the electric potential of the second charging part 140 may vary. In this case, since external electrons are introduced into the second charging part 140, electrostatic induction between the first and second electrodes 122 and 124 may be amplified. However, inventive concepts are not limited thereto. For example, the distance d1 between the first charging part 110 and the grounding unit 130 may be greater than the width W of the second charging part 140. In this case, the second charging part 140 may make contact with the grounding unit 130 after separating from the first charging part 110.

If the second charging part 140 is brought into contact with the grounding unit 130, the second charging part 140 may be electrically connected to the charge reservoir 133. The second charging part 140 may include a conductive material for easy electric connection. If the second charging part 140 is brought into contact with the grounding unit 130, the second charging part 140 and the charge reservoir 133 may exchange charges with each other. Owing to this exchange of charges, the electric potential of the second charging part 140 may become equal to the electric potential of the charge reservoir 133. For example, if the electric potential of the charge reservoir 133 is equal to the electric potential of the ground, the charge reservoir 133 may supply electrons to the second charging part 140 through the grounding unit 130.

Figure 7:
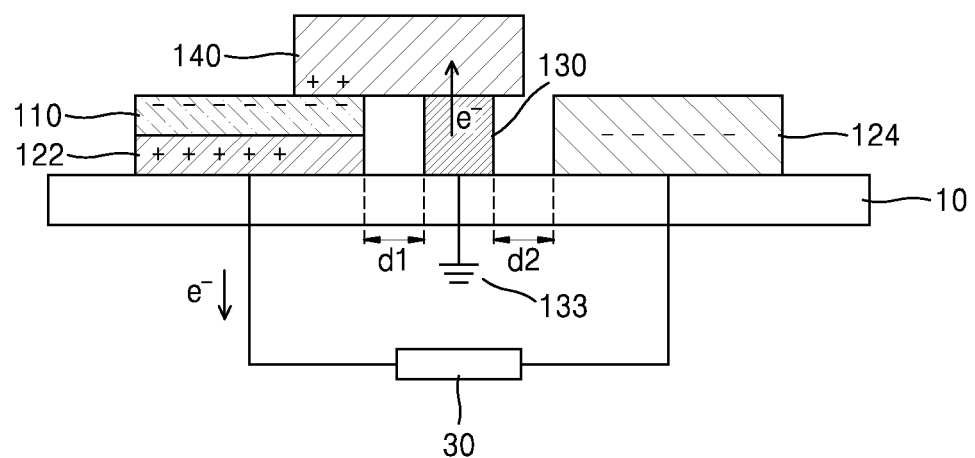
FIG. 7 is a view illustrating a state in which the second charging part is further moved relative to a substrate through a sliding motion.

FIG. 7 is a view illustrating a state in which the second charging part 140 is further moved relative to the first substrate 10 through a sliding motion.

Referring to FIG. 7, the contact area between the second charging part 140 and the first charging part 110 may gradually decrease because of sliding. As the contact area between the second charging part 140 and the first charging part 110 decreases, electrostatic induction may occur between the first and second electrodes 122 and 124. Due to the electrostatic induction, current may flow between the first and second electrodes 122 and 124. The electric potential of the second charging part 140 may be maintained to be close to the electric potential of the ground.

Figure 8:
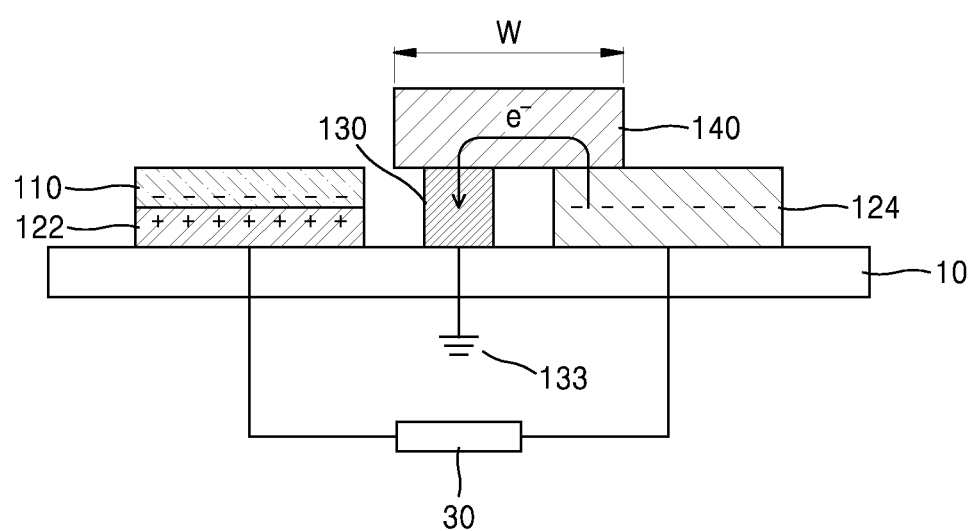
FIG. 8 is a view illustrating a state in which the second charging part meets a second electrode as a result of a sliding motion.

FIG. 8 is a view illustrating a state in which the second charging part 140 meets the second electrode 124 as a result of a sliding motion.

Referring to FIG. 8, the first and second charging parts 110 and 140 may separate from each other. In addition, the second charging part 140 may make contact with the grounding unit 130 and the second electrode 124. To allow the second charging part 140 to contact both the grounding unit 130 and the second electrode 124, the distance d2 between the grounding unit 130 and the second electrode 124 may be less than the width W of the second charging part 140.

When the second charging part 140 contacts the grounding unit 130 and the second electrode 124, the electric potential of the second electrode 124 may vary because of the charge reservoir 133. For example, as a negative charge of the second electrode 124 moves to the charge reservoir 133 through the second charging part 140 and the grounding unit 130, the electric potential of the second electrode 124 may become substantially equal to the electric potential of the ground.

Figure 9:
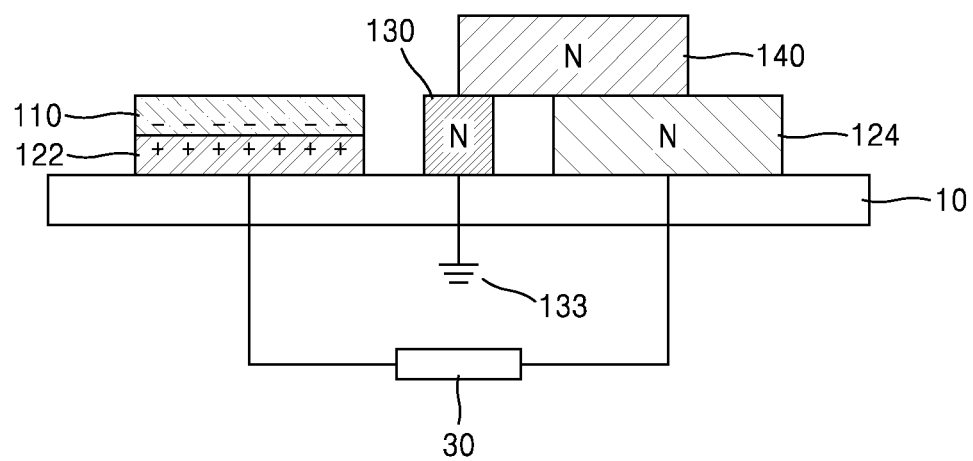
FIG. 9 is a view illustrating a state in which the second charging part is further moved relative to the substrate through a sliding motion.

FIG. 9 is a view illustrating a state in which the second charging part 140 is further moved relative to the first substrate 10 as a result of sliding.

Referring to FIG. 9, as electrons move from the second electrode 124 to the grounding unit 130, the electric potential of the second charging part 140 and the second electrode 124 may become substantially equal to the electric potential of the ground.

Figure 10:
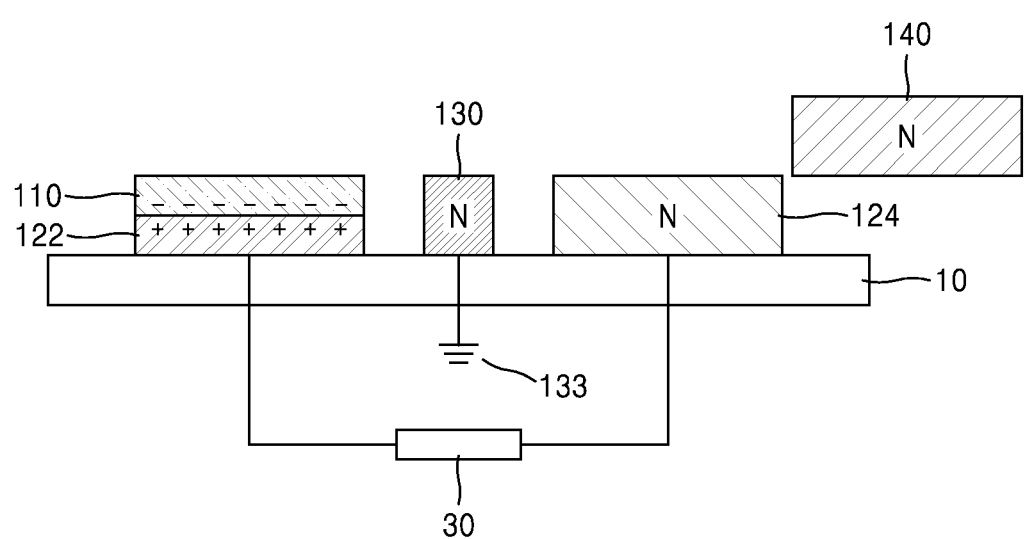
FIG. 10 is a view illustrating a state in which the second charging part is separated from the second electrode as a result of a sliding motion.

FIG. 10 is a view illustrating a state in which the second charging part 140 is separate from the second electrode 124 as a result of a sliding motion.

Referring to FIG. 10, as the second charging part 140 is separated from the second electrode 124, a first cycle illustrated with reference to FIGS. 5 to 10 may terminate. After the first cycle terminates, the first charging part 110 may be maintained in a negatively charged state. The first electrode 122 may have a relatively large amount of positive charge compared to the amount of negative charge because of the influence of negative charge of the first charging part 110. After charge equilibrium is established as illustrated in FIG. 10, there may be substantially no movement of charge until the next cycle in which the second charging part 140 and the first charging part 110 meet each other. In addition, since the next cycle starts after the second charging part 140 and the second electrode 124 have the electric potential of the ground, a larger amount of electric energy may be obtained in the next cycle.

Hereinafter, an explanation will be given of a process of harvesting energy in cycles after the first cycle described with reference to FIGS. 5 to 10.

Figure 11:
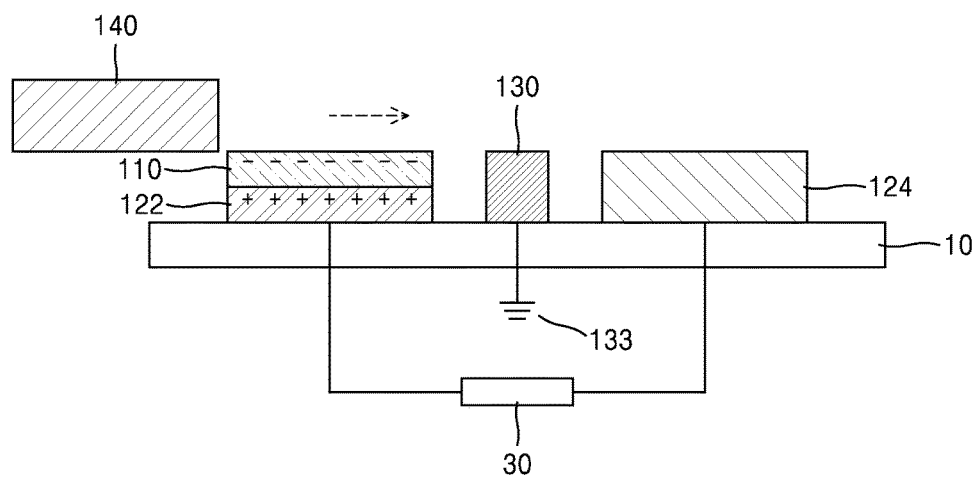
FIG. 11 is a view illustrating a state in which the second charging part approaches the first charging part.

FIG. 11 is a view illustrating a state in which the second charging part 140 approaches the first charging part 110.

Referring to FIG. 11, the first charging part 110 may already have a negative charge unlike the case described with reference to FIG. 5.

Figure 12:
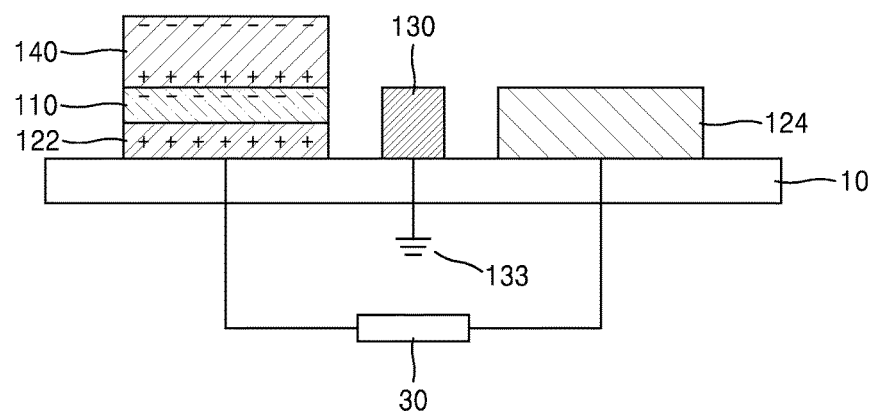
FIG. 12 is a view illustrating a state in which the second charging part contacts the first charging part through a sliding motion.

FIG. 12 is a view illustrating a state in which the second charging part 140 contacts the first charging part 110 through a sliding motion.

Referring to FIG. 12, since the first charging part 110 is already in a charged state, the amount of electron exchange between the first and second charging parts 110 and 140 may be relatively small. The second charging part 140 may be affected by the negative charge distributed on the surface of the first charging part 110. A positive charge may be induced on a lower surface of the second charging part 140, and a negative charge may be induced on an upper surface of the second charging part 140.

Figure 13:
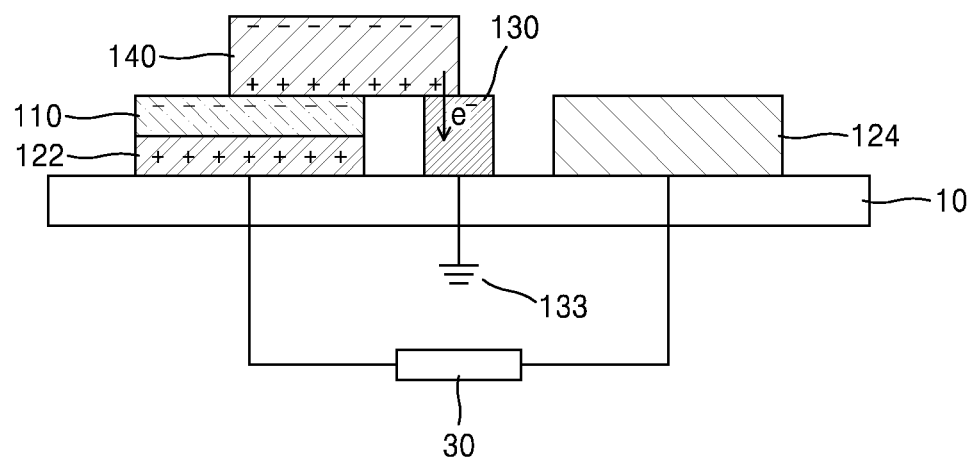
FIG. 13 is a view illustrating a state in which the second charging part meets the grounding unit as a result of a sliding motion.

FIG. 13 is a view illustrating a state in which the second charging part 140 meets the grounding unit 130 as a result of a sliding motion.

When the second charging part 140 contacts the grounding unit 130, the electric potential of the second charging part 140 may vary to the electric potential of the ground. In this process, electrons may move from the second charging part 140 to the grounding unit 130.

Figure 14:
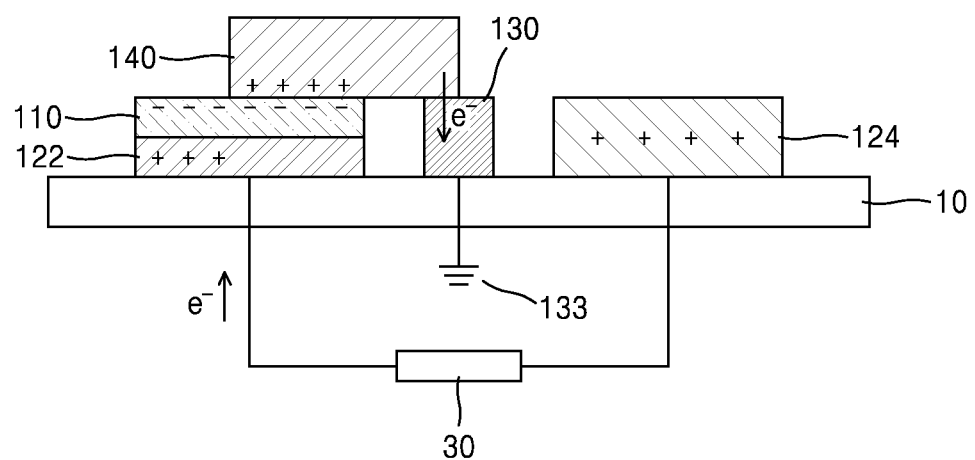
FIG. 14 is a view illustrating a state in which the electric potential of the second charging part varies as a result of a flow of electrons shown in FIG. 13.

FIG. 14 is a view illustrating a state in which the electric potential of the second charging part 140 is varied by the flow of electrons illustrated in FIG. 13.

Referring to FIG. 14, a positive charge may remain in a portion of the second charging part 140 making contact with the first charging part 110. The remaining positive charge of the second charging part 140 may be balanced with the negative charge on the surface of the first charging part 110, and thus the electric potential of the second charging part 140 may become equal to the electric potential of the ground. In addition, as electrons move from the second charging part 140 to the grounding unit 130, the amount of positive charge may be greater than the amount of negative charge in the second charging part 140.

Since a portion of the upper surface of the first charging part 110 is not in contact with the second charging part 140, electrostatic induction may occur between the first and second electrodes 122 and 124. Due to the electrostatic induction, electrons may move from the second electrode 124 to the first electrode 122 for electrical equilibrium. As electrons flow between the first and second electrodes 122 and 124, electric energy may be harvested using the load 30 between the first and second electrodes 122 and 124.

Figure 15:
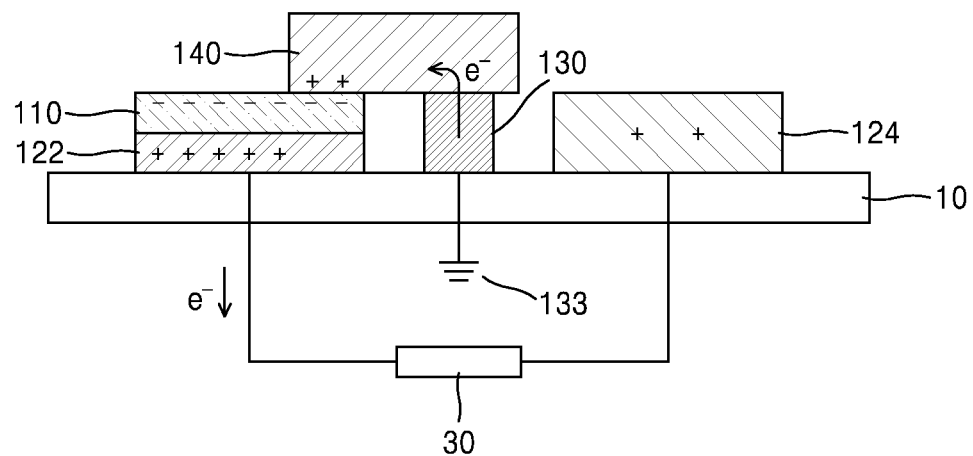
FIG. 15 is a view illustrating a state in which the second charging part is further moved relative to the substrate through a sliding motion.

FIG. 15 is a view illustrating a state in which the second charging part 140 is further moved relative to the first substrate 10 as a result of a sliding motion.

Referring to FIG. 15, as the contact area between the second charging part 140 and the first charging part 110 decreases, electrons may move from the first electrode 122 to the second electrode 124. In addition, electrons may move from the charge reservoir 133 to the second charging part 140, maintaining the electric potential of the second charging part 140 to be equal to the electric potential of the ground. Since the second charging part 140 receives an external charge through the grounding unit 130, the amount of energy harvest through the load 30 may be amplified during sliding of the second charging part 140.

Figure 16:
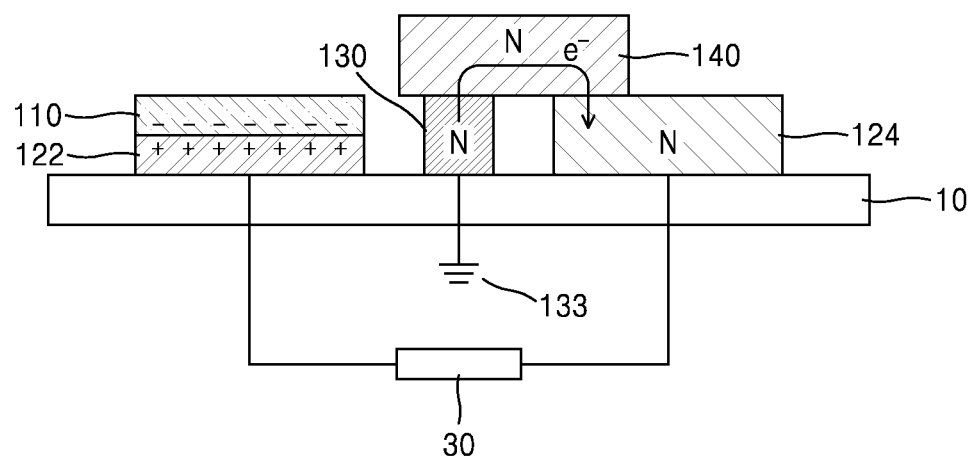
FIG. 16 is a view illustrating a state in which the second charging part contacts the second electrode as a result of a sliding motion.

FIG. 16 is a view illustrating a state in which the second charging part 140 is in contact with the second electrode 124 as a result of a sliding motion.

Referring to FIG. 16, the first and second charging parts 110 and 140 may separate from each other. In addition, the second charging part 140 may make contact with the grounding unit 130 and the second electrode 124. To allow the second charging part 140 to contact both the grounding unit 130 and the second electrode 124, the distance d2 between the grounding unit 130 and the second electrode 124 may be less than the width W of the second charging part 140. The second electrode 124 may be connected to the charge reservoir 133 through the second charging part 140 and the grounding unit 130. As electrons move from the charge reservoir 133 to the second electrode 124, the electric potential of the second electrode 124 may become equal to the electric potential of the charge reservoir 133. For example, the electric potential of the second electrode 124 may become substantially equal to the electric potential of the ground.

Figure 17:
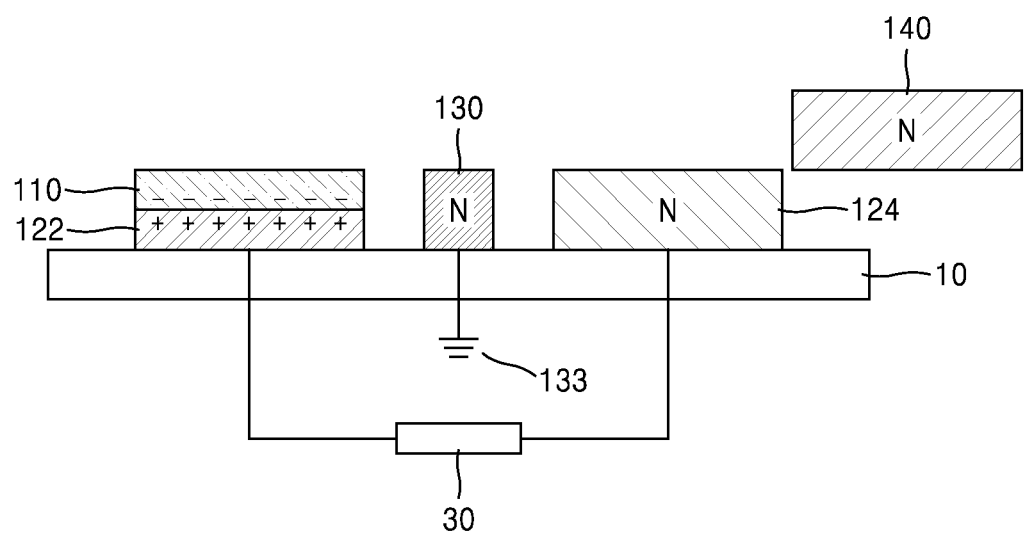
FIG. 17 is a view illustrating a state in which the second charging part is separated from the second electrode as a result of a sliding motion in the state shown in FIG. 16.

FIG. 17 is a view illustrating a state in which the second charging part 140 is separate from the second electrode 124 as a result of a sliding motion in the state shown in FIG. 16.

Referring to FIG. 17, as the second charging part 140 separates from the second electrode 124, the cycle illustrated with reference to FIGS. 11 to 16 may terminate. Referring to FIG. 17, after the processes described with reference to FIGS. 11 to 16, the first and second charging parts 110 and 140 and the first and second electrodes 122 and 124 may have the same charge distribution as that shown in FIG. 11. Therefore, if the second charging part 140 is slid again on the upper surface of the first charging part 110, the processes described with reference to FIGS. 11 to 16 may be repeated. Thus, while the cycle is repeated, electric energy may be harvested from current flowing between the first and second electrodes 122 and 124. While the second charging part 140 is moved relative to other members by a sliding motion, the grounding unit 130 may exchange charges with the second charging part 140 and the second electrode 124. Since the second charging part 140 and the second electrode 124 exchange charges with the charge reservoir 133, which is an external device, the amount of electric energy harvest may be increased during sliding cycles.

In FIG. 1, the first and second electrodes 122 and 124, the first charging part 110, and the grounding unit 130 are disposed on the first substrate 10 having a flat shape. However, inventive concepts are not limited thereto. For example, the first substrate 10 may have any other shape to easily repeat the cycles illustrated with reference to FIGS. 1 to 17.

Figure 18:
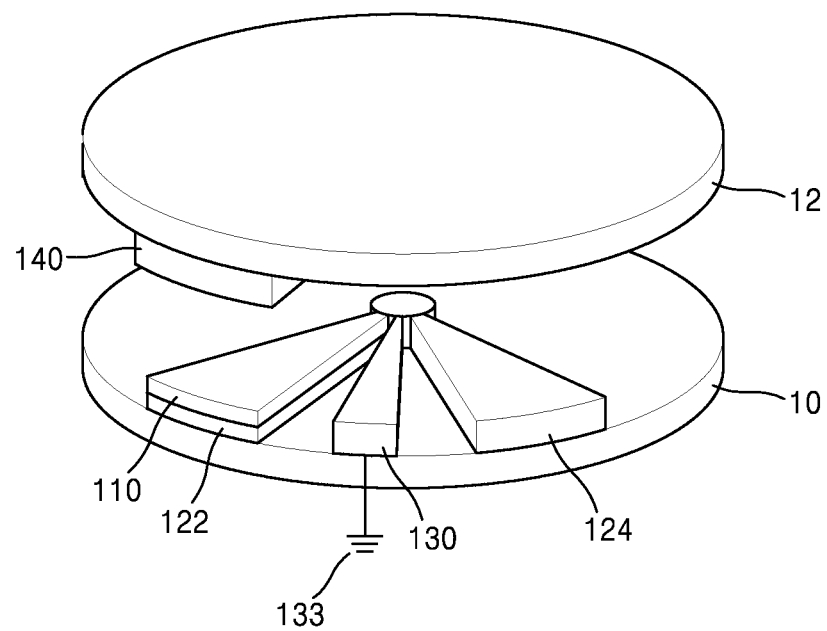
FIG. 18 is a perspective view illustrating a triboelectric generator having a different shape according to some example embodiments.

FIG. 18 is a perspective view illustrating a triboelectric generator having a different shape, according to some example embodiments.

Referring to FIG. 18, the triboelectric generator may include a first substrate 10 having a circular plate shape. A first electrode 122, a grounding unit 130, and a second electrode 124 may be arranged on the first substrate 10 in radial directions. In addition, a first charging part 110 may be placed on an upper surface of the first electrode 122. For example, the first electrode 122, the first charging part 110, the grounding unit 130, and the second electrode 124 may have a fan shape. However, inventive concepts are not limited thereto.

A second charging part 140 may face an upper surface of the first substrate 10 and may be rotatable relative to the first substrate 10. For example, the triboelectric generator may further include a second substrate 12 on which the second charging part 140 is disposed. The second substrate 12 may have a circular plate shape. When at least one of the first and second substrates 10 and 12 is rotated, the second charging part 140 may slide on upper surfaces of the first charging part 110, the grounding unit 130, and the second electrode 124. However, inventive concepts are not limited thereto. For example, the triboelectric generator may not include the second substrate 12. For example, a rotation center of the second charging part 140 may be connected to the first substrate 10 so that the second charging part 140 may be slid on the upper surfaces of the first charging part 110, the grounding unit 130, and the second electrode 124.

In FIG. 18, the first electrode 122, the grounding unit 130, and the second electrode 124 are arranged on the first substrate 10. However, inventive concepts are not limited thereto. For example, a plurality of sets each including a first electrode 122, a grounding unit 130, and a second electrode 124 may be disposed on the first substrate 10. Similarly, a plurality of second charging parts 140 may be disposed on the second substrate 12.

Figure 19:
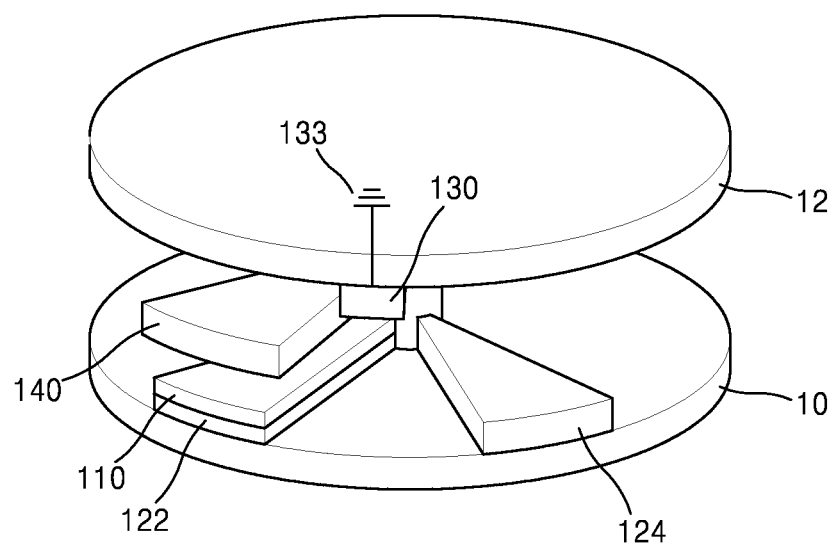
FIG. 19 is a perspective view illustrating a triboelectric generator having a different shape according to some example embodiments.

FIG. 19 is a perspective view illustrating a triboelectric generator having a different shape, according to some example embodiments.

Referring to FIG. 19, the triboelectric generator may include a first substrate 10 and a second substrate 12 that have a circular plate shape. A first electrode 122 and a second electrode 124 may be arranged on the first substrate 10 in radial directions. In addition, a first charging part 110 may be placed on an upper surface of the first electrode 122. In addition, a grounding unit 130 may be placed on the second substrate 12.

A rotation center of a second charging part 140 may be connected to the first and second substrates 10 and 12. The second charging part 140 may move between the first and second substrates 10 and 12. While the second charging part 140 moves relative to the first and second substrates 10 and 12, the second charging part 140 may sequentially slide on surfaces of the first charging part 110, the grounding unit 130, and the second electrode 124.

Figure 20:
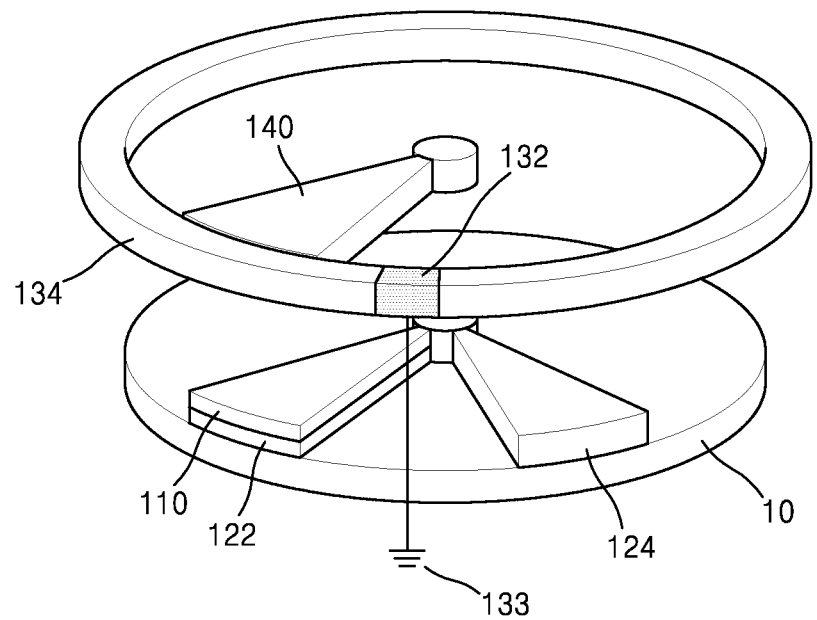
FIG. 20 is a perspective view illustrating a triboelectric generator having a different shape according to some example embodiments.

FIG. 20 is a perspective view illustrating a triboelectric generator having a different shape, according to some example embodiments.

Referring to FIG. 20, the triboelectric generator may include a first substrate 10 having a circular plate shape. A first electrode 122 and a second electrode 124 may be arranged on the first substrate 10 in radial directions. In addition, a first charging part 110 may be placed on an upper surface of the first electrode 122.

The triboelectric generator may include a ring having a conductive material portion 132 and an insulative material portion 134. The conductive material portion 132 may be electrically connected to a charge reservoir 133 so as to function as a grounding unit. A second charging part 140 may slide on an inner circumferential surface of the ring through a rotation motion relative to the ring. While the second charging part 140 slides on an inner circumferential surface of the insulative material portion 134, the charge reservoir 133 and the second charging part 140 may not be electrically connected to each other. While the second charging part 140 slides on an inner circumferential surface of the conductive material portion 132, the charge reservoir 133 and the second charging part 140 may be electrically connected to each other. The conductive material portion 132 may be located between the first charging part 110 and the second charging part 140.

Figure 21:
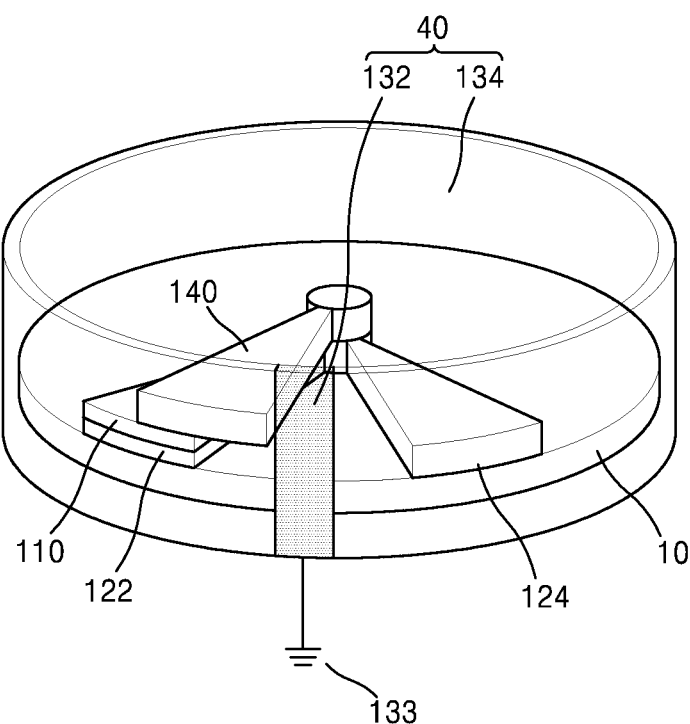
FIG. 21 is a perspective view illustrating a triboelectric generator having a different shape according to some example embodiments.

FIG. 21 is a perspective view illustrating a triboelectric generator having a different shape, according to some example embodiments.

Referring to FIG. 21, the triboelectric generator may include a first substrate 10 having a circular plate shape. A first electrode 122 and a second electrode 124 may be arranged on the first substrate 10 in radial directions. In addition, a first charging part 110 may be placed on an upper surface of the first electrode 122.

The triboelectric generator may include a cylindrical case 40 having a conductive material portion 132 and an insulative material portion 134. The conductive material portion 132 may be electrically connected to a charge reservoir 133 so as to function as a grounding unit. A second charging part 140 may slide on an inner wall of the case 40 through a rotation motion relative to the case 40. While the second charging part 140 slides on an inner wall of the insulative material portion 134, the charge reservoir 133 and the second charging part 140 may not be electrically connected to each other. While the second charging part 140 slides on an inner wall of the conductive material portion 132, the charge reservoir 133 and the second charging part 140 may be electrically connected to each other. The conductive material portion 132 may be located between the first charging part 110 and the second charging part 140.

Figure 22:
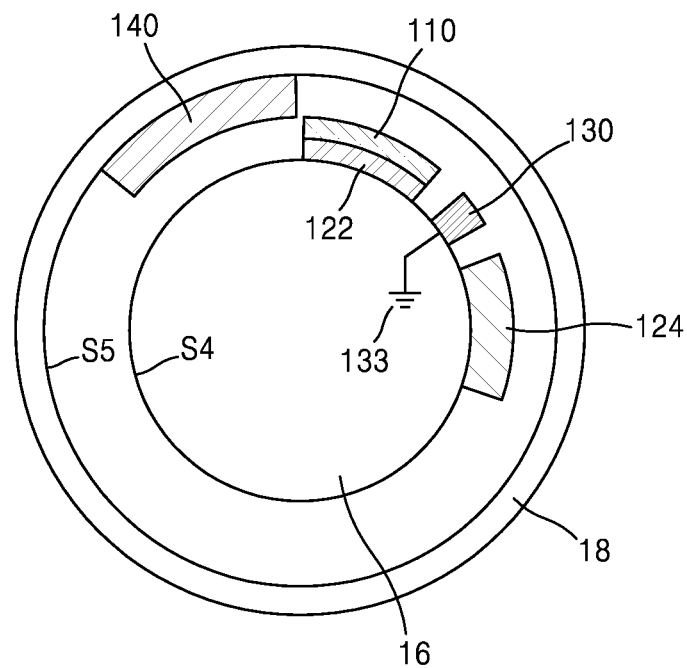
FIG. 22 is a perspective view illustrating a triboelectric generator having a different shape according to some example embodiments.

FIG. 22 is a cross-sectional view illustrating a triboelectric generator having a different shape, according to some example embodiments.

Referring to FIG. 22, the triboelectric generator may include a third substrate 16 on which a first electrode 122, a grounding unit 130, and a second electrode 124 are arranged. The third substrate 16 may have a circular post shape. Although the third substrate 16 is illustrated as having a circular post shape in FIG. 22, inventive concepts are not limited thereto. For example, the third substrate 16 may have a hollow cylindrical shape. The first electrode 122, the grounding unit 130, and the second electrode 124 may be disposed on an outer surface S4 of the third substrate 16. The grounding unit 130 may be connected to a charge reservoir 133. In addition, a first charging part 110 may be disposed on an upper surface of the first electrode 122.

A second charging part 140 may move while facing the outer surface S4 of the first substrate 10. The triboelectric generator may further include a fourth substrate 18 on which the second charging part 140 is disposed. For example, the second charging part 140 may be disposed on an inner surface S5 of the fourth substrate 18. When at least one of the third and fourth substrates 16 and 18 is rotated, the second charging part 140 may sequentially slide on upper surfaces of the first charging part 110, the grounding unit 130, and the second electrode 124. In this manner, the cycles described with reference to FIGS. 5 to 17 may be repeated.

In FIG. 22, the first electrode 122, the grounding unit 130, and the second electrode 124 are arranged on the third substrate 16. However, inventive concepts are not limited thereto. For example, a plurality of sets each including a first electrode 122, a grounding unit 130, and a second electrode 124 may be disposed on the outer surface S4 of the third substrate 16. Similarly, a plurality of second charging parts 140 may be disposed on the inner surface S5 of the second substrate 12.

In addition, unlike the structure shown in FIG. 22, the second charging parts 140 may be disposed on the outer surface S4 of the third substrate 16, and the first electrode 122, the first charging part 110, the grounding unit 130, and the second electrode 124 may be disposed on the inner surface S5 of the fourth substrate 18.

Figure 23:
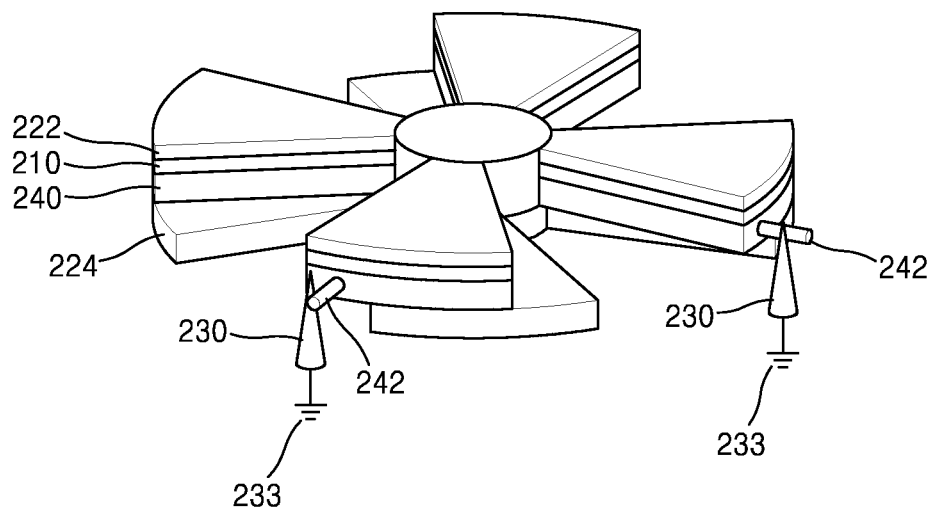
FIG. 23 is illustrates a triboelectric generator having a different shape according to some example embodiments.

FIG. 23 illustrates a triboelectric generator having a different shape, according to some example embodiments.

Referring to FIG. 23, a second charging part 240 may be slid on a first charging part 210 while being rotated relative to the first charging part 210. The second charging part 240 may slide on surfaces of the first charging part 210 and a second electrode 224 at a position between the first charging part 210 and the second electrode 224. A first electrode 222 and the second electrode 224 may be spaced apart from each other in a direction in which the second charging part 240 slides.

The first charging part 210 may be disposed on a lower surface of the first electrode 222 facing the second charging part 240. The second charging part 240 may face the first charging part 210 and may intermittently contact the first charging part 210 through a sliding motion. In addition, the second charging part 240 may intermittently contact the second electrode 224 through a sliding motion. A grounding unit 230 may include a conductive post. The grounding unit 230 may be electrically connected to a charge reservoir 233, and when the second charging part 240 rotates, the grounding unit 230 may intermittently contact the second charging part 240. For example, the second charging part 240 may include protrusions 242 on outer surfaces thereof. When the second charging part 240 rotates, the protrusions 242 may intermittently contact the grounding unit 230.

Each of the first and second charging parts 210 and 240 and the first and second electrodes 222 and 224 may include a plurality of radially extending wings. For example, the first and second charging parts 210 and 240 and the first and second electrodes 222 and 224 may have a fan shape.

Hereinafter, operations of the triboelectric generator illustrated in FIG. 23 will be described. In the following drawings, only one of the plurality of wings of each of the first and second charging parts 210 and 240 and the first and second electrodes 222 and 224 is illustrated for ease of illustration.

Figure 24:
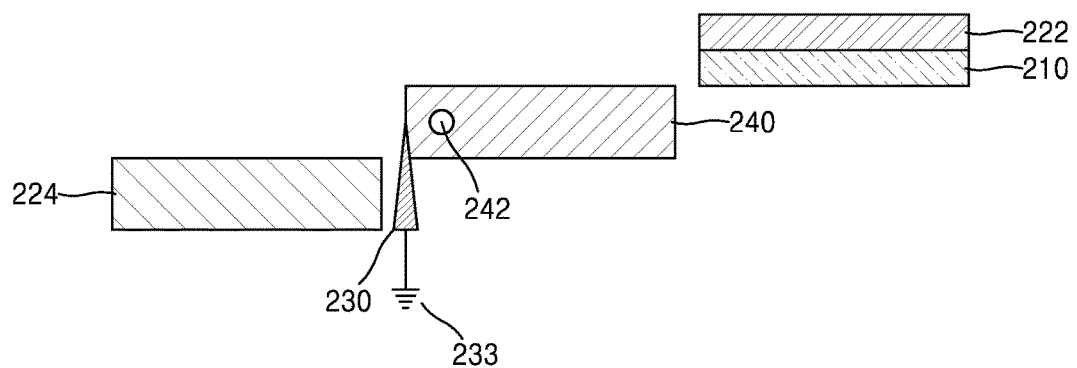
FIG. 24 is a schematic cross-sectional view illustrating a triboelectric generator according to some example embodiments.

FIG. 24 is a schematic cross-sectional view illustrating the triboelectric generator according to some example embodiments.

Referring to FIG. 24, the second charging part 240 may be separate from the grounding unit 230, the second electrode 224, and the first charging part 210. The first charging part 210 may move in interlock with the first electrode 222. The first charging part 210 may approach the second charging part 240 as a result of a relative movement.

Figure 25:
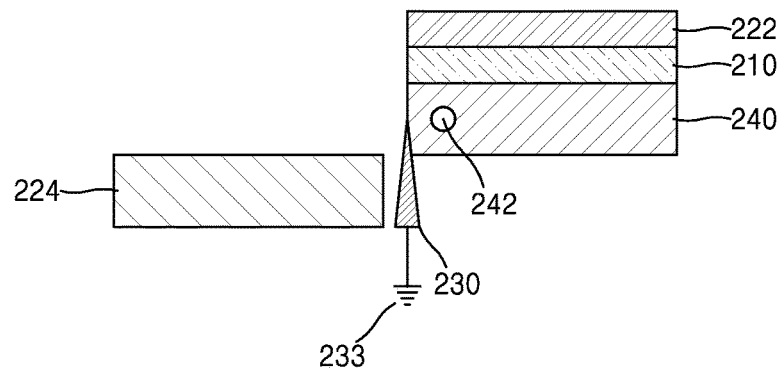
FIG. 25 is a view illustrating a state in which first and second charging parts are in contact with each other.

FIG. 25 is a view illustrating a state in which the first and second charging parts 210 and 240 are in contact with each other.

Referring to FIG. 25, the first and second charging parts 210 and 240 may contact each other through a sliding motion. When the first and second charging parts 210 and 240 contact each other, surfaces of the first and second charging parts 210 and 240 may be charged with different polarities. After the first and second charging parts 210 and 240 contact each other, the first and second charging parts 210 and 240 may move in interlock with each other. For example, the first and second charging parts 210 and 240 may move in interlock with each other like the hour and minute hands of a clock.

Figure 26:
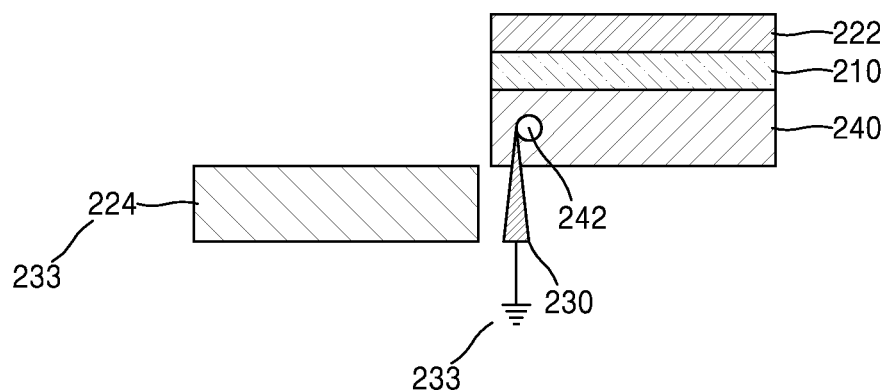
FIG. 26 is a view illustrating a state in which the second charging part contacts a grounding unit.

FIG. 26 is a view illustrating a state in which the second charging part 240 is in contact with the grounding unit 230.

Referring to FIG. 26, while the first and second charging parts 210 and 240 move in interlock with each other, a protrusion 242 of the second charging part 240 may contact the grounding unit 230. When the second charging part 240 is electrically connected to the grounding unit 230, the electric potentials of the second charging part 240 and the charge reservoir 233 may become equal to each other. For example, the electric potential of the second charging part 240 may become substantially equal to the electric potential of ground.

Figure 27:
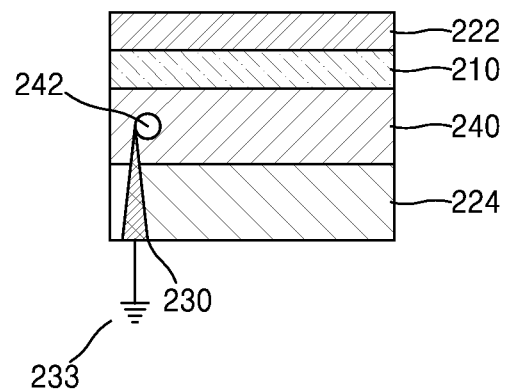
FIG. 27 is a view illustrating a state in which the second charging part contacts a second electrode.

FIG. 27 is a view illustrating a state in which the second charging part 240 is in contact with the second electrode 224.

Referring to FIG. 27, the second charging part 240 may contact the second electrode 224 through a sliding motion. When the second charging part 240 contacts the second electrode 224, the electric potential of the second electrode 224 may also become equal to the electric potential of the ground.

Figure 28:
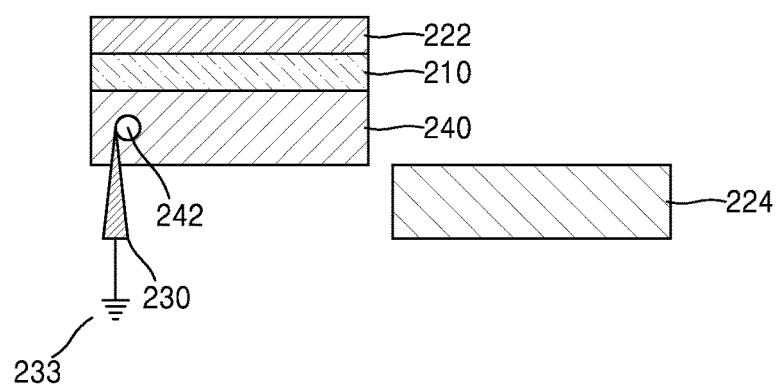
FIGS. 28 and 29 are views illustrating the second charging part separating from the second electrode and the first charging part.
Figure 29:
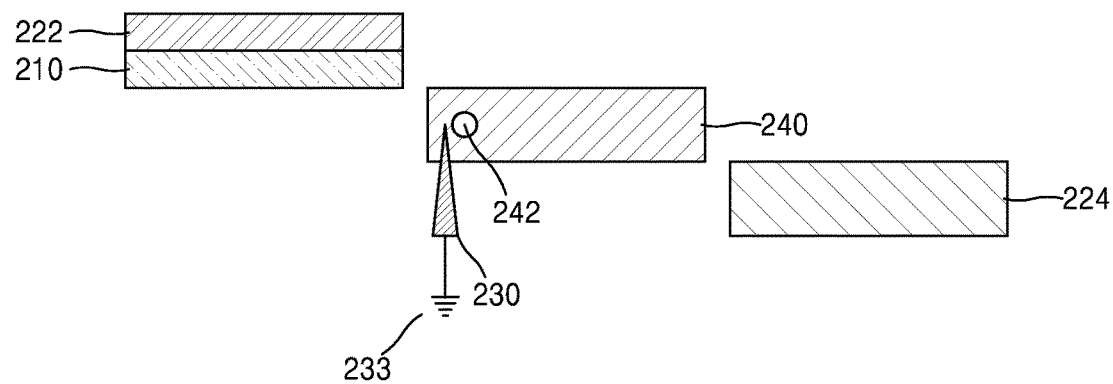

FIGS. 28 and 29 are views illustrating the second charging part 240 separating from the second electrode 224 and the first charging part 210.

In the example shown in FIGS. 28 and 29, the second charging part 240 first separates from the second electrode 224. However, inventive concepts are not limited thereto. For example, the second charging part 240 may first separate from the first charging part 210 and may then separate from the second electrode 224. In another example, the second charging part 240 may separate from the first charging part 210 and the second electrode 224 substantially at the same time. Thereafter, as shown in FIG. 29, the second charging part 240 may separate from the grounding unit 230.

If the second charging part 240 separates from the second electrode 224, the electric potential of the second electrode 224 may not be equal to the electric potential of the ground. In addition, as the second charging part 240 separates from the first charging part 210, the first and second electrodes 222 and 224 may have different electric potentials. If the first and second electrodes 222 and 224 have different electric potentials, current may flow between the first and second electrodes 222 and 224. While current flows between the first and second electrodes 222 and 224, electric energy may be harvested using a load 30 between the first and second electrodes 222 and 224. During the processes shown in FIGS. 24 to 29, the second charging part 240 and the second electrode 224 may exchange charges with the outside through the grounding unit 230, and thus the amount of current flowing between the first and second electrodes 222 and 224 may be further amplified. In addition, as shown in FIG. 29, the first charging part 210, the second charging part 240, the second electrode 224, and the grounding unit 230 are all separate from each other. From this state, the processes described with reference to FIGS. 24 to 29 may be repeated.

Figure 30:
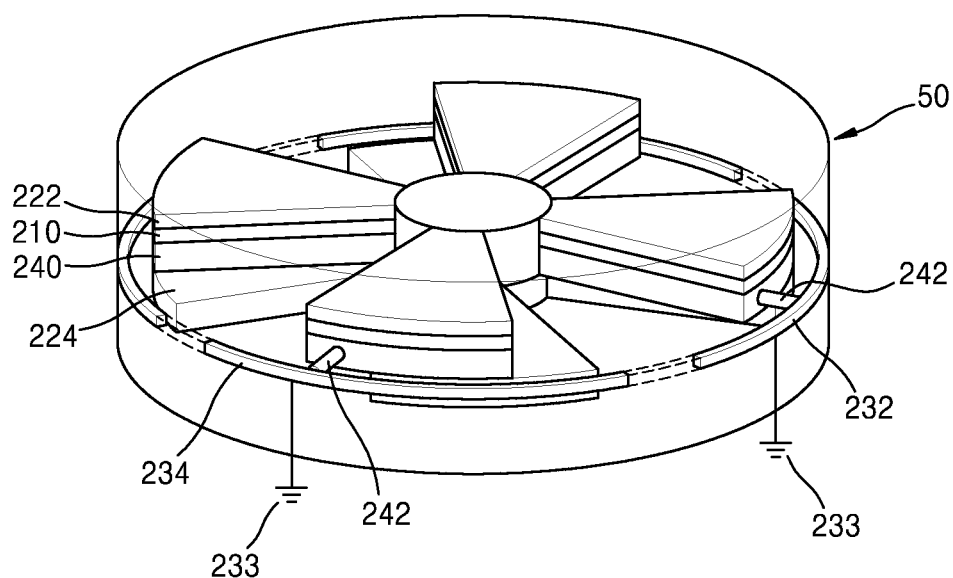
FIG. 30 is a view illustrating a modification of the triboelectric generator shown in FIG. 23.

FIG. 30 is a view illustrating a modification of the triboelectric generator shown in FIG. 23.

Referring to FIG. 30, a grounding unit may include conductive members 232 and insulative members 234 alternately arranged in a direction in which a second charging part 240 rotates. The conductive members 232 may be electrically connected to a charge reservoir 233, and when the second charging part 240 rotates, the conductive members 232 may intermittently contact the second charging part 240.

For example, the conductive members 232 and the insulative members 234 may be disposed on an inner wall of a cylindrical case 50. The distribution of the conductive members 232 may be determined such that the conductive members 232 may contact the second charging part 240 in the same regions as the regions in which the second charging part 240 and the grounding unit 230 illustrated in FIGS. 26 to 28 contact each other.

Figure 31:
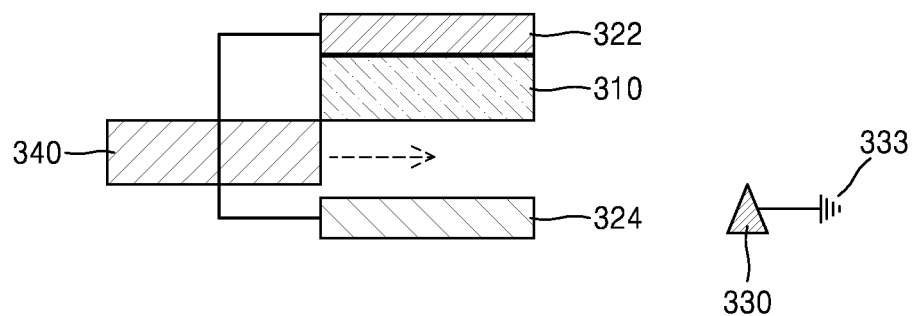
FIG. 31 is a cross-sectional view illustrating a triboelectric generator according to some example embodiments.

FIG. 31 is a cross-sectional view illustrating a triboelectric generator according to some example embodiments.

Referring to FIG. 31, the triboelectric generator may include: a first electrode 322 and a second electrode 324 spaced apart from each other; a first charging part 310 disposed on a lower surface of the first electrode 322; a second charging part 340 configured to slide in a direction (x-axis direction) while facing a lower surface of the first charging part 310, so as to be charged with a polarity opposite to that of the first charging part 310 as a result of contact with the first charging part 310; and a grounding unit 330 configured to intermittently connect the second charging part 340 to a charge reservoir 333 according to the movement of the second charging part 340.

The second charging part 340 may move relative to the first charging part 310 and the second electrode 324 at a position between the first charging part 310 and the second electrode 324. The second charging part 340 may contact the lower surface of the first charging part 310 through a sliding motion. In addition, the second charging part 340 may be spaced apart from the second electrode 324. Therefore, while the second charging part 340 slides on the lower surface of the first charging part 310, the second charging part 340 may not contact the second electrode 324.

The second charging part 340 and the first charging part 310 may include materials having different charging ratings. Therefore, when surfaces of the second charging part 340 and the first charging part 310 rub together, the first charging part 310 and the second charging part 340 may be charged with different polarities.

For example, the first charging part 310 may be charged with a negative charge by friction with the second charging part 340, and the second charging part 340 may be charged with a positive charge by friction with the first charging part 310. The second charging part 340 may include a conductive material for easy electric connection with the grounding unit 330. The conductive material may include at least one of aluminum (Al), copper (Cu), gold (Au), and steel that are easily charged by friction. In addition, the first charging part 310 may include at least one of polytetrafluoroethylene (Teflon), fluorinated ethylene propylene (FEP), poly(methyl methacrylate) (PMMA), polyvinylidene fluoride (PVDF), polycarbonate (PC), polyvinyl chloride (PVC), polyimide (Kapton), polypropylene (PP), polyethylene (PE), and polystyrene (PS) that are easily charged with a negative charge by friction with the conductive material of the second charging part 340. In addition, the first charging part 310 may include an organic polymer such as poly(methyl methacrylate) PMMA, polyethylene terephthalate (PET), polyetheretherketone (PEEK), cycloolefin copolymer (COC), or polytetrafluoroethylene (PTFE). The first charging part 310 may include an inorganic polymer such as polydimethylsiloxane (PDMS) or organically modified ceramic (ORMOCER). The above-listed materials are examples, and inventive concepts are not limited thereto.

In another example, the first charging part 310 may be charged with a positive charge by friction with the second charging part 340, and the second charging part 340 may be charged with a negative charge by friction with the first charging part 310. The second charging part 340 may include a conductive material for easy electric connection with the grounding unit 330. The conductive material may include at least one of aluminum (Al), copper (Cu), gold (Au), and steel that are easily charged by friction. In addition, the first charging part 310 may include at least one of polyformaldehyde, ethylcellulose, polyamide, melamine formol, wool, silk, mica, and nylon that are easily charged with a positive charge by friction with the conductive material. The above-listed materials are examples, and inventive concepts are not limited thereto.

At least one of the first and second charging parts 310 and 340 may be doped with a p-type dopant or an n-type dopant so as to adjust charging characteristics of the surface thereof. Examples of a source of the p-type dopant may include ionic liquids such as $NO_2BF_4$, $NOBF_4$, or $NO_2SbF_6$; acidic compounds such as $HCl$, $H_2PO_4$, $CH_3COOH$, $H_2SO_4$, or $HNO_3$; and organic compounds such as dichlorodicyanoquinone (DDQ), oxone, dimyristoylphosphatidylinositol (DMPI), or trifluoromethanesulfoneimide. Other examples of the source of the p-type dopant may include $HPtCl_4$, $AuCl_3$, $HAuCl_4$, AgOTf (silver trifluoromethanesulfonate), $AgNO_3$, $H_2PdCl_6$, $Pd(OAc)_2$, and $Cu(CN)_2$.

Examples of a source of the n-type dopant may include a reduction product of a substituted or unsubstituted nicotinamide; a reduction product of a compound which is chemically bound to a substituted or unsubstituted nicotinamide; and a compound including at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Alternatively, the source of the n-type dopant may include a polymer such as polyethyleneimine (PEI). Alternatively, the n-type dopant may include an alkali metal such as potassium (K) or lithium (Li). The above-listed p-type dopant materials and n-type dopant materials are examples. That is, any other materials may be used as the p-type dopant and the n-type dopant.

The grounding unit 330 may be electrically connected to the charge reservoir 333. The charge reservoir 133 may include ground or a conductive member, the electric potential of which substantially does not vary, that is, maintains substantially a constant value. When the second charging part 340 contacts the grounding unit 330, the charge reservoir 333 and the second charging part 340 may be electrically connected to each other through the grounding unit 330. When the second charging part 340 is connected to the charge reservoir 333 through the grounding unit 330, the electric potential of the second charging part 340 may become substantially equal to the electric potential of the charge reservoir 333.

The first and second electrodes 322 and 324 may include a material having a high degree of electric conductivity. For example, the first and second electrodes 322 and 324 may include at least one of graphene, carbon nanotube (CNT), indium tin oxide (ITO), a metal, and a conductive polymer. For example, the metal may include at least one of silver (Ag), aluminum (Al), copper (Cu), gold (Au), nickel (Ni), chromium (Cr), and platinum (Pt). However, the metal is not limited thereto. The first and second electrodes 322 and 324 may have a single-layer or multilayer structure.

Figure 32:
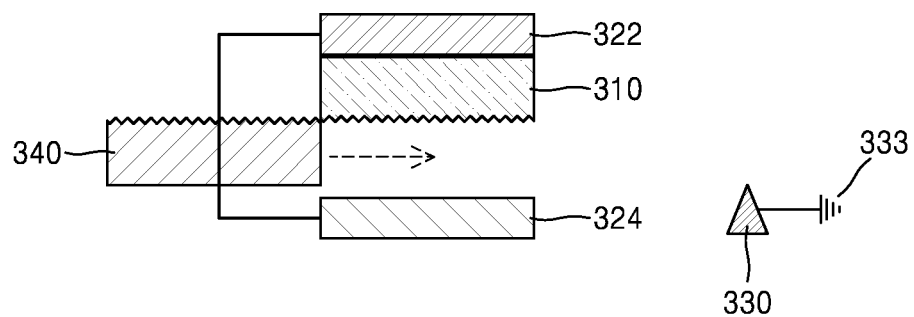
FIG. 32 is a view illustrating a modification of the triboelectric generator shown in FIG. 31.

FIG. 32 is a view illustrating a modification of the triboelectric generator shown in FIG. 31. In the following description with reference to FIG. 32, the same description as that given above with reference to FIG. 31 will not be repeated.

Referring to FIG. 32, a plurality of protrusions may be formed on at least one of contact surfaces between the first charging part 310 and the second charging part 340. The protrusions may include nano-pyramids, nano-wires, nano-balls, nano-rods, or the like. Since the protrusions are formed on at least one of the contact surfaces between the first charging part 310 and the second charging part 340, when the first charging part 310 and the second charging part 340 are brought into contact with each other, the amount of charge induced on each of the contact surface of the first charging part 310 and the contact surface of the second charging part 340 may be increased.

Figure 33:
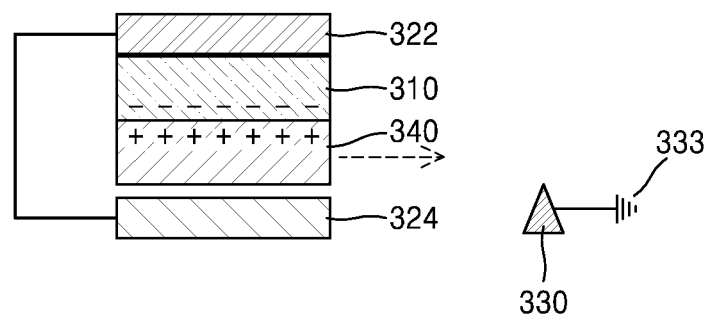
FIG. 33 is a view illustrating a state in which first and second charging parts shown in FIG. 31 are in contact with each other.

FIG. 33 is a view illustrating a state in which the first and second charging parts 310 and 340 shown in FIG. 31 are in contact with each other as a result of a sliding motion.

Referring to FIG. 33, when the first and second charging parts 310 and 340 contact each other, the surfaces of the first and second charging parts 310 and 340 may be charged with different polarities. In the example shown in FIG. 33, the surface of the second charging part 340 is charged with a positive charge, and the surface of the first charging part 310 is charged with a negative charge. However, inventive concepts are not limited thereto. For example, the surface of the first charging part 310 may be charged with a positive charge, and the surface of the second charging part 340 may be charged with a negative charge.

Figure 34:
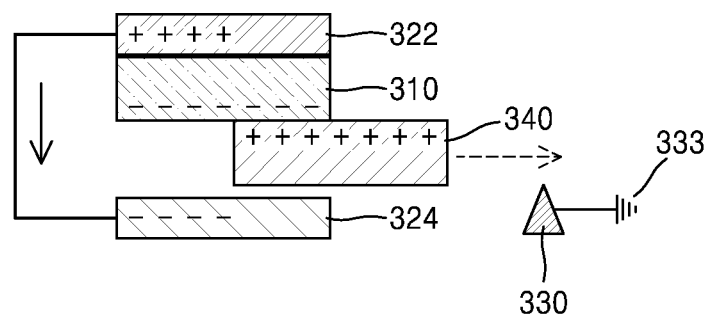
FIG. 34 is a view illustrating a state in which the second charging part is moved relative to the first charging part through a sliding motion.

FIG. 34 illustrates a state in which the second charging part 340 is moved relative to the first charging part 310 through a sliding motion.

Referring to FIG. 34, a portion of the surface of the first charging part 310 may not be in contact with the second charging part 340. Electrons may move from the first electrode 322 to the second electrode 324 because of electrostatic induction occurring in a region close to the portion of the surface of the first charging part 310 that is not in contact with the second charging part 340. That is, current may flow between the first and second electrodes 322 and 324.

Figure 35:
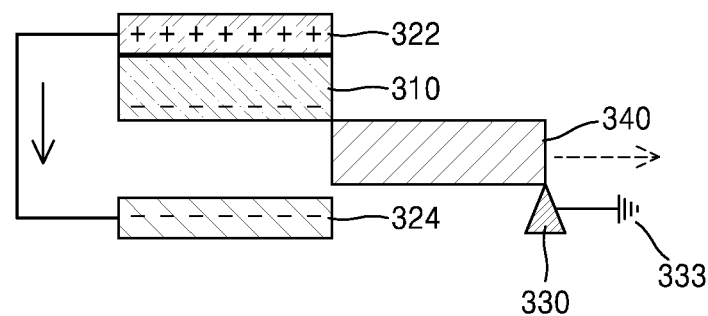
FIG. 35 is a view illustrating a state in which the second charging part contacts a grounding unit through a sliding motion.

FIG. 35 is a view illustrating a state in which the second charging part 340 is in contact with the grounding unit 330 as a result of a sliding motion.

Referring to FIG. 35, the second charging part 340 may contact the grounding unit 330 and may exchange charges with the charge reservoir 333. Since the second charging part 340 exchanges charges with the charge reservoir 333, the electric potential of the second charging part 340 may become equal to the electric potential of the charge reservoir 333. For example, electrons may move from the charge reservoir 333 to the second charging part 340, and thus the electric potential of the second charging part 340 may become substantially equal to the electric potential of the ground.

Figure 36:
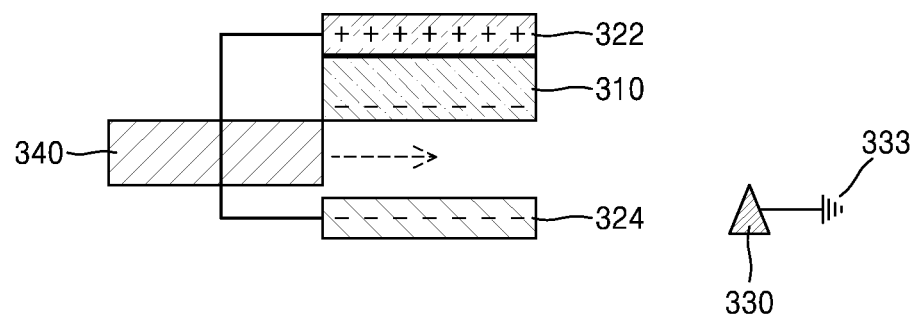
FIG. 36 is a view illustrating a state in which the second charging part approaches again the first charging part after the cycle described with reference to FIGS. 31 to 34 is completed.

FIG. 36 is a view illustrating a state in which the second charging part 340 approaches again the first charging part 310 after the cycle described with reference to FIGS. 31 to 34 is completed.

Referring to FIG. 36, in an electrical equilibrium after the cycle described with reference to FIGS. 31 to 35, the surface of the first charging part 310 may have a negative charge. In addition, the first electrode 322 may have a relatively large amount of positive charge, and the second electrode 324 may have a relatively large amount of negative charge.

Figure 37:
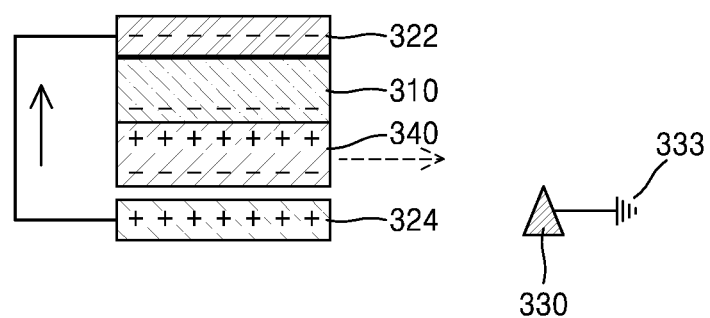
FIG. 37 is a view illustrating a state in which the second charging part contacts the first charging part as a result of a sliding motion.

FIG. 37 is a view illustrating a state in which the second charging part 340 is in contact with the first charging part 310 as a result of a sliding motion.

Referring to FIG. 37, since the first charging part 310 is already in a charged state, the amount of electron exchange between the first and second charging parts 310 and 340 may be relatively small. The second charging part 340 may be affected by the negative charge on the surface of the first charging part 310. A positive charge may be induced on an upper surface of the second charging part 340, and a negative charge may be induced on a lower surface of the second charging part 340.

Figure 38:
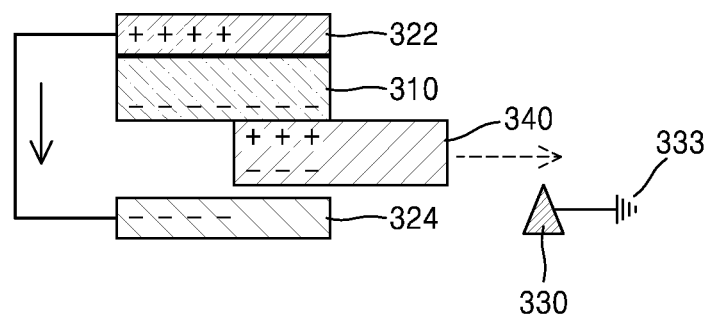
FIG. 38 is a view illustrating a state in which the second charging part is moved relative to the first charging part through a sliding motion.

FIG. 38 is a view illustrating a state in which the second charging part 340 is moved relative to the first charging part 310 through a sliding motion.

Referring to FIG. 38, a portion of the surface of the first charging part 310 may not be in contact with the second charging part 340. Electrons may move from the first electrode 322 to the second electrode 324 because of electrostatic induction occurring in a region close to the portion of the surface of the first charging part 310 that is not in contact with the second charging part 340. As described with reference to FIG. 36, since a new cycle is started after the electric potential of the second charging part 340 is varied by the charge reservoir 333, current flowing between the first and second electrodes 322 and 324 may be increased. That is, the amount of current flowing between the first and second electrodes 322 and 324 may be larger in the case of using the grounding unit 330 than in the case of not using the grounding unit 330.

Figure 39:
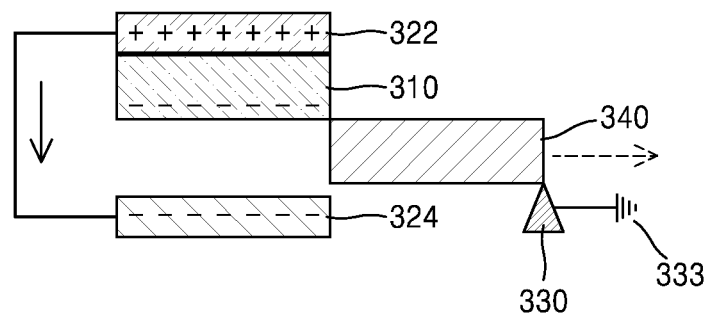
FIG. 39 is a view illustrating a state in which the second charging part contacts the grounding unit through a sliding motion.

FIG. 39 is a view illustrating a state in which the second charging part 340 is in contact with the grounding unit 330 as a result of a sliding motion.

Referring to FIG. 39, the second charging part 340 may contact the grounding unit 330 and may exchange charges with the charge reservoir 333. Since the second charging part 340 exchanges charges with the charge reservoir 333, the electric potential of the second charging part 340 may become equal to the electric potential of the charge reservoir 333. For example, electrons may move from the charge reservoir 333 to the second charging part 340, and thus the electric potential of the second charging part 340 may become substantially equal to the electric potential of the ground. As the electric potential of the second charging part 340 is equal to the electric potential of the ground, the first charging part 310 and the first and second electrodes 322 and 324 may have the same state as that shown in FIG. 35. In addition, as the cycle described with reference to FIGS. 36 to 39 is repeated, electric energy may be repeatedly harvested. In addition, since the second charging part 340 exchanges charges with the charge reservoir 333, the amount of electric energy harvest may be increased during sliding cycles.

Figure 40:
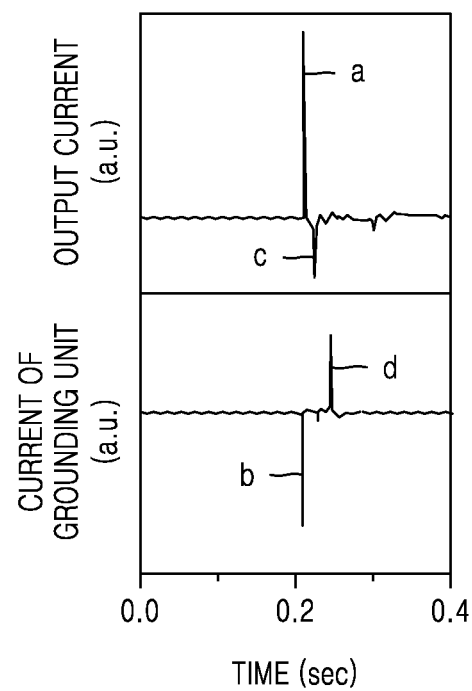
FIG. 40 is a current-time graph of the triboelectric generator shown in FIGS. 1 to 17, illustrating current flowing between first and second electrodes, and current flowing in the grounding unit.

FIG. 40 is a current-time graph of the triboelectric generator illustrated in FIGS. 1 to 17, illustrating current flowing between the first and second electrodes 122 and 124, and current flowing in the grounding unit 130. In FIG. 40, the right curve indicates current flowing between the first and second electrodes 122 and 124, and the left curve indicates current flowing in the grounding unit 130.

Referring to FIG. 40, the curve indicating current flowing between the first and second electrodes 122 and 124 may include two peaks (a) and (c) in different directions. The reason for this is that the direction of electron movement between the first and second electrodes 122 and 124 shown in FIG. 14 is different from the direction of electron movement between the first and second electrodes 122 and 124 shown in FIG. 15. In addition, the curve indicating current flowing in the grounding unit 130 may also have two peaks (b) and (d) in different directions. The reason for this is that the direction of electron movement in the grounding unit 130 shown in FIG. 14 is different from the direction of electron movement in the grounding unit 130 shown in FIG. 15. Therefore, the output current flowing between the first and second electrodes 122 and 124 of the triboelectric generator may be alternating current.

Figure 41:
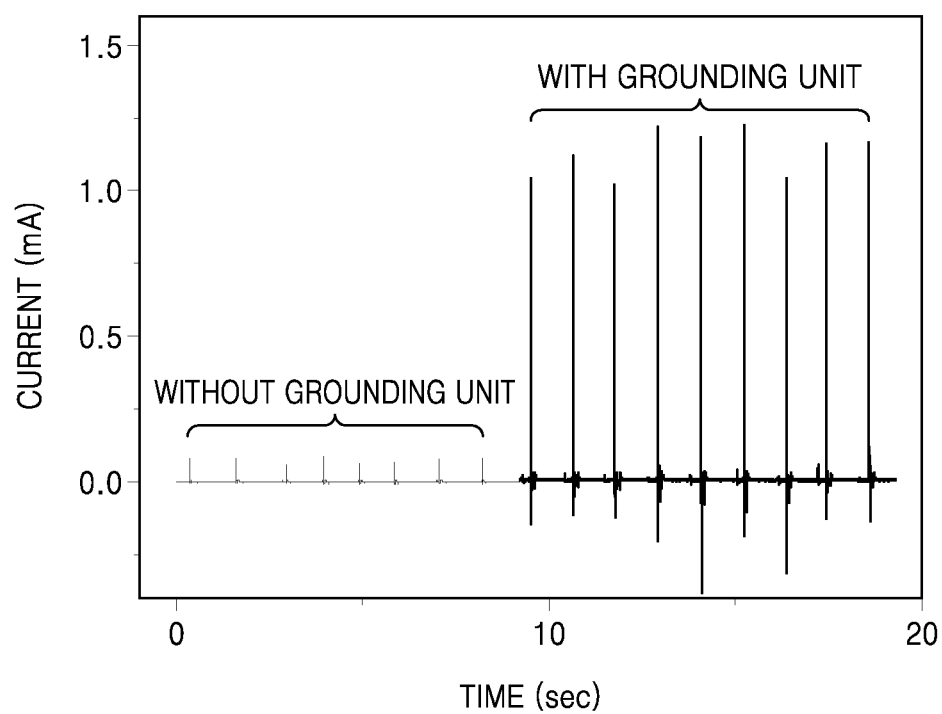
FIG. 41 is a graph for comparing an output current measured between the first and second electrodes of the triboelectric generator shown in FIGS. 1 to 17 with an output current measured between the first and second electrodes of the triboelectric generator after the grounding unit was removed from the triboelectric generator.

FIG. 41 is a graph for comparing an output current measured between the first and second electrodes 122 and 124 of the triboelectric generator described with reference to FIGS. 1 to 17 with an output current measured between the first and second electrodes 122 and 124 of the triboelectric generator after the grounding unit 130 was removed from the triboelectric generator.

In FIG. 41, the left curve indicates an output current with respect to time in the case of not using the grounding unit 130, and the right curve indicates an output current with respect to time in the case of using the grounding unit 130.

Figure 42:
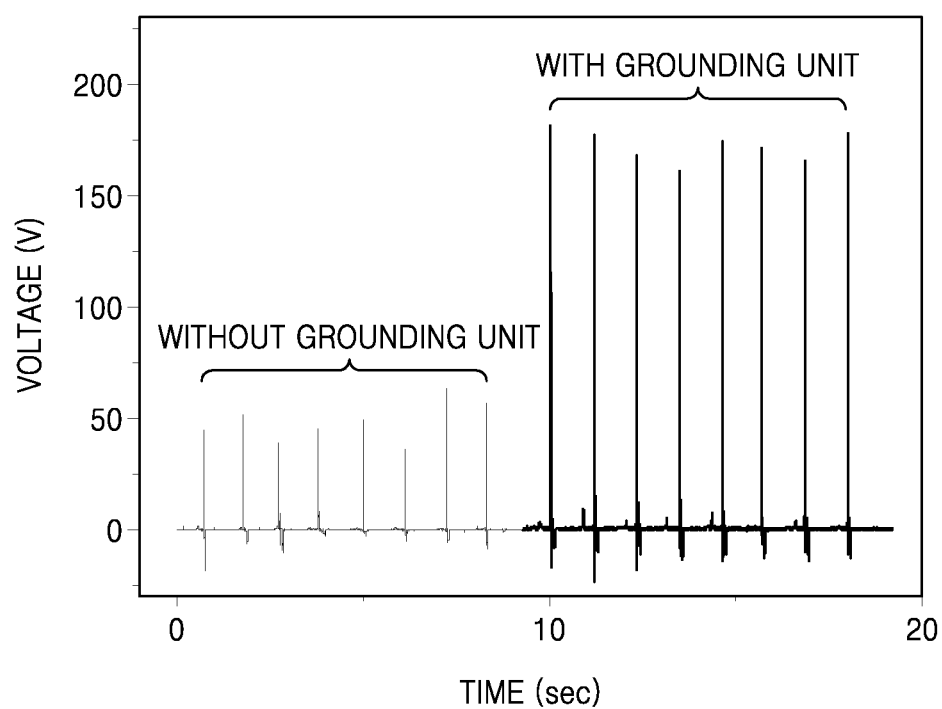
FIG. 42 is a graph for comparing a voltage measured between the first and second electrodes of the triboelectric generator shown in FIGS. 1 to 17 with a voltage measured between the first and second electrodes of the triboelectric generator after the grounding unit was removed from the triboelectric generator.

FIG. 42 is a graph for comparing a voltage measured between the first and second electrodes 122 and 124 of the triboelectric generator described with reference to FIGS. 1 to 17 with a voltage measured between the first and second electrodes 122 and 124 of the triboelectric generator after the grounding unit 130 was removed from the triboelectric generator.

In FIG. 42, the left curve indicates a voltage between the first and second electrodes 122 and 124 with respect to time in the case of not using the grounding unit 130, and the right curve indicates a voltage between the first and second electrodes 122 and 124 with respect to time in the case of using the grounding unit 130.

Referring to FIGS. 41 and 42, when the grounding unit 130 is not used, current flowing between the first and second electrodes 122 and 124 may be lower than about 0.2 mA, and voltage between the first and second electrodes 122 and 124 may be merely about 50 V.

However, when the grounding unit 130 is used, current and voltage between the first and second electrodes 122 and 124 may be amplified. Since the charge reservoir 133 and the second charging parts 140 exchange charges with each other through the grounding unit 130, current and voltage between the first and second electrodes 122 and 124 may be amplified. When the grounding unit 130 is used, output current may be increased by a factor of about 10, and a current peak of about 1 mA or greater may be obtained. In addition, when the grounding unit 130 is used, output voltage may be increased by a factor of about 4, and a voltage peak of about 150V to about 200 V may be obtained.

Figure 43:
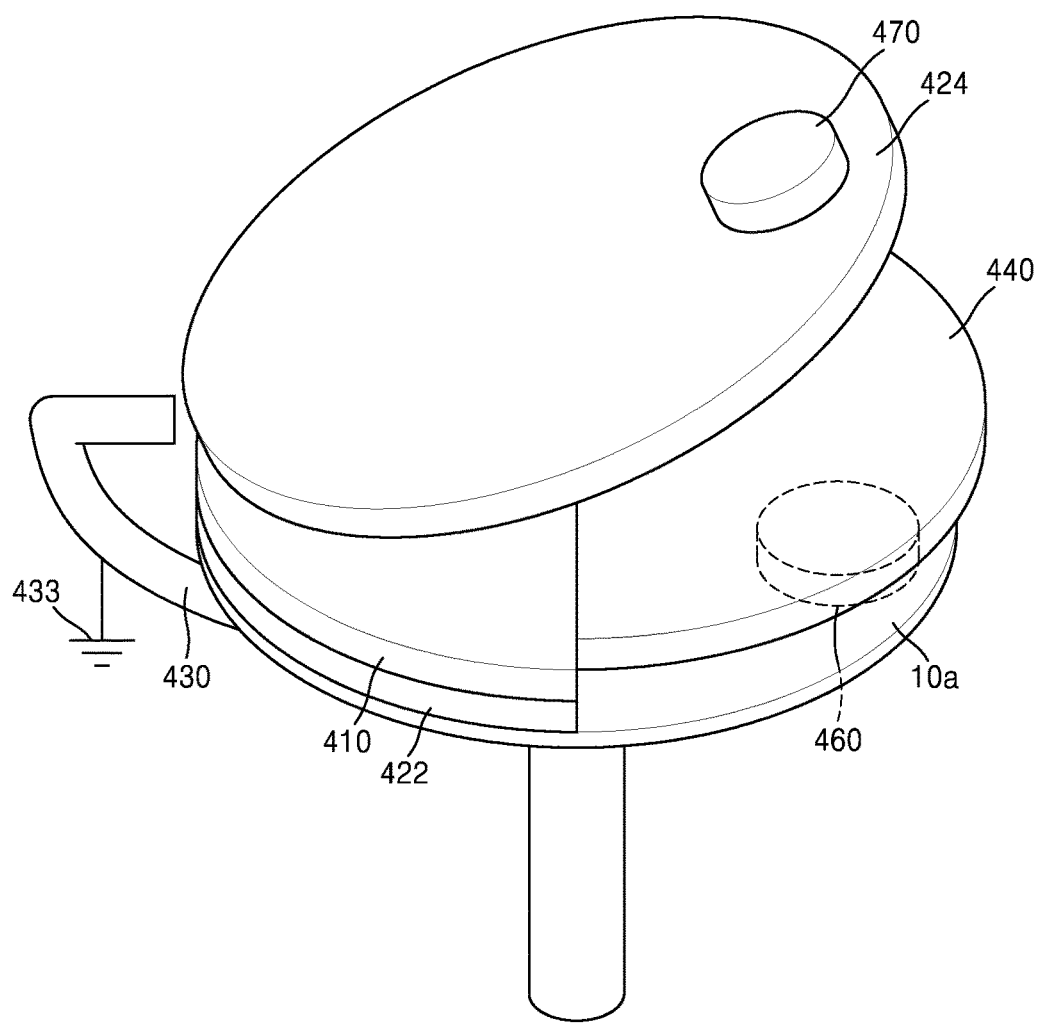
FIG. 43 is a perspective view illustrating a triboelectric generator according to some example embodiments.
Figure 44:
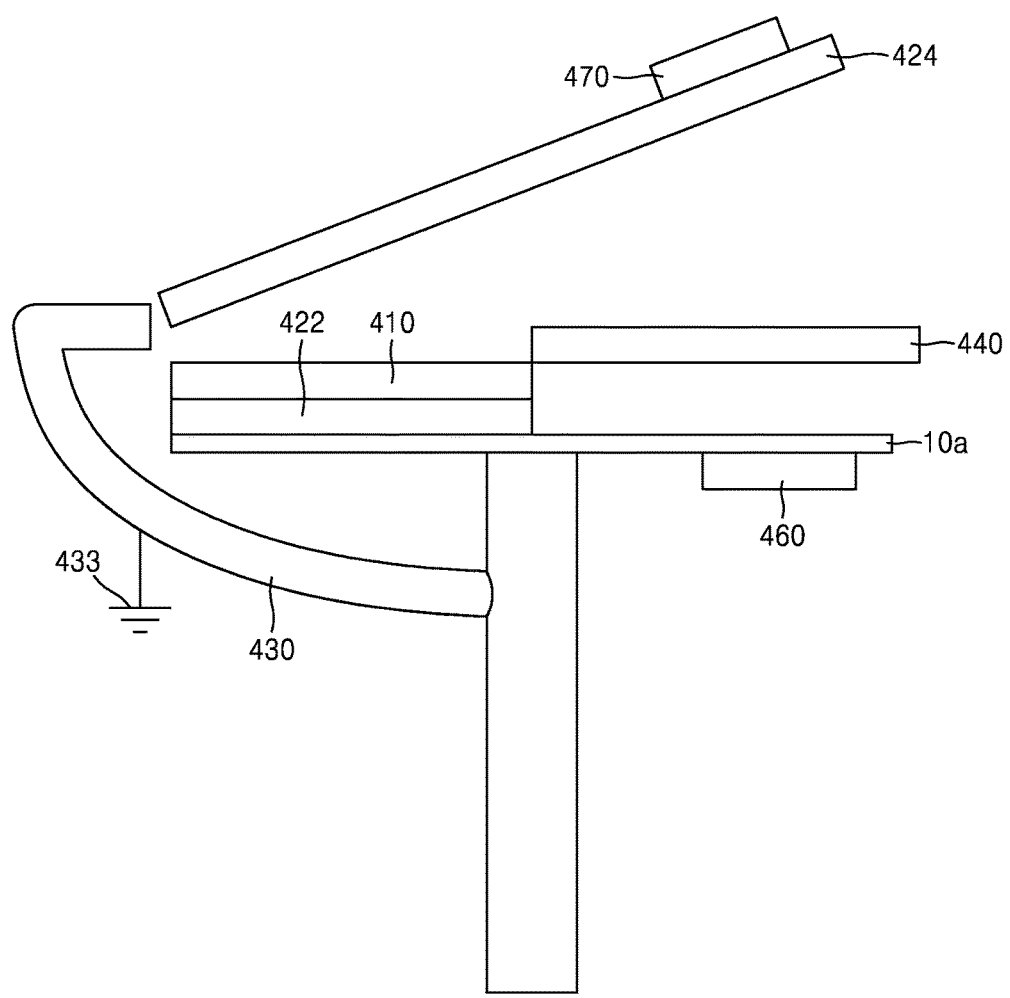
FIG. 44 is a side view illustrating the triboelectric generator shown in FIG. 43.
Figure 45:
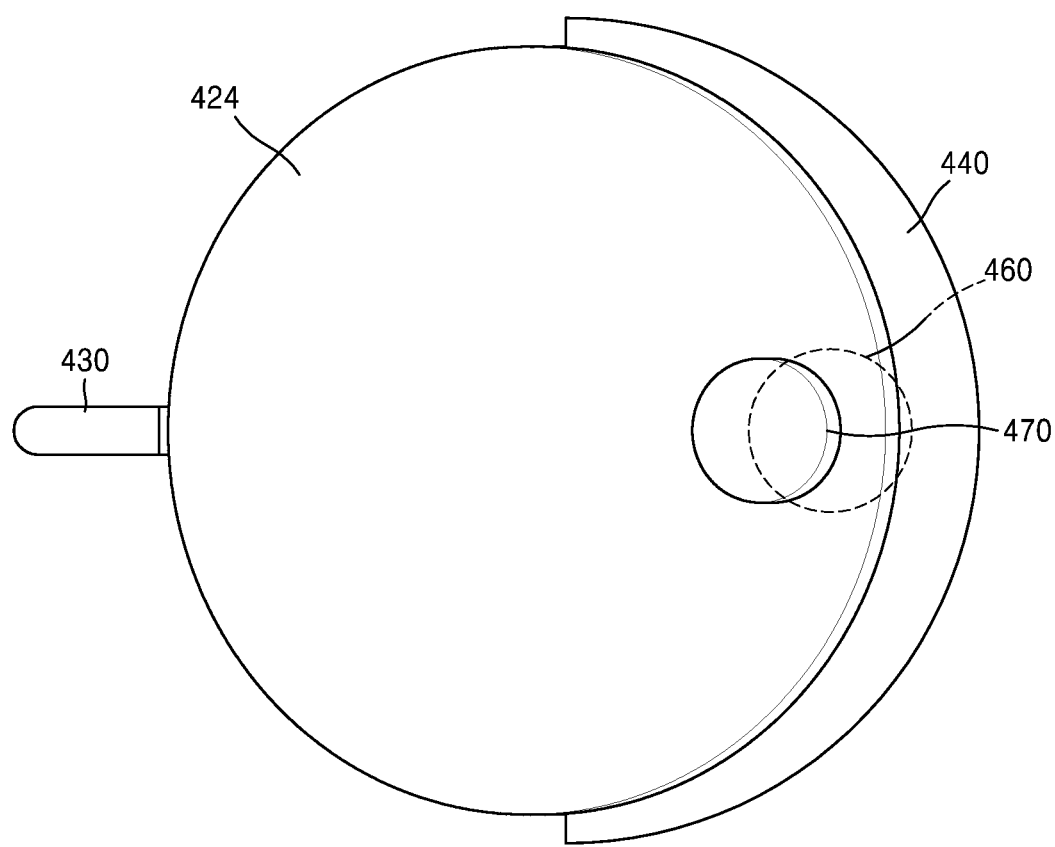
FIG. 45 is a top view illustrating the triboelectric generator shown in FIG. 43.

FIG. 43 is a perspective view illustrating a triboelectric generator according to some example embodiments. FIG. 44 is a side view illustrating the triboelectric generator illustrated in FIG. 43, and FIG. 45 is a top view illustrating the triboelectric generator illustrated in FIG. 43.

Referring to FIGS. 43 to 54, the triboelectric generator may include: a first electrode 422 and a second electrode 424 spaced apart from each other; a first charging part 410 disposed on an upper surface of the first electrode 422; a second charging part 440 configured to be charged with a polarity opposite to that of the first charging part 410 when rubbed against the first charging part 410 through a sliding motion; and a first magnetic part 460. In addition, the triboelectric generator may include a second magnetic part 470 interlocked with the second electrode 424 so as to move the second electrode 424 relative to the second charging part 440 under the influence of magnetic force of the first magnetic part 460.

In addition, the triboelectric generator may include a grounding unit 430 configured to intermittently connect a charge reservoir 433 to the second charging part 440 and the second electrode 424 to which the second magnetic part 470 is attached.

The first charging part 410, the first electrode 422, the grounding unit 430, and the first magnetic part 460 may be interlocked with each other. Therefore, when the first charging part 410 rotates relative to the second charging part 440 and the second electrode 424, the first electrode 422, the grounding unit 430, and the first magnetic part 460 may also rotate relative to the second charging part 440 and the second electrode 424.

Rotation of the second charging part 440 relative to the first charging part 410 may occur when the first charging part 410 or the second charging part 440 rotates. That is, rotation of the second charging part 440 relative to the first charging part 410 may be accomplished by rotating the second charging part 440, or rotating the first charging part 410 in a state in which the second charging part 440 is fixed. In addition, rotation of the second charging part 440 relative to the first charging part 410 may be accomplished by rotating both the first and second charging parts 410 and 440.

For example, when the first charging part 410 rotates, the first electrode 422, the grounding unit 430, and the first magnetic part 460 may also rotate in interlock with the first charging part 410. To interlock the first charging part 410, the first electrode 422, the grounding unit 430, and the first magnetic part 460 with each other, the triboelectric generator may include a first substrate 10a on which the first electrode 422 and the first magnetic part 460 are disposed. A rotation shaft of the grounding unit 430 may be interlocked with the first substrate 10a. When the first substrate 10a rotates, the first electrode 422, the first charging part 410 disposed on the upper surface of the first electrode 422, the grounding unit 430, and the first magnetic part 460 may rotate together with the first substrate 10a.

The first substrate 10a may have a circular plate shape for ease of rotation. The first electrode 422 and the first charging part 410 may have a fan shape. In FIG. 43, the first electrode 422 and the first charging part 410 are illustrated as having a semicircular plate shape. However, inventive concepts are not limited thereto. For example, the first electrode 422 and the first charging part 410 may have a fan shape, and the central angle of the fan shape may not be 180°. In another example, the first electrode 422 and the first charging part 410 may having a radially extending shape other a fan shape. The second charging part 440 may also have a fan shape or a radially extending shape.

In the example described above, the first charging part 410 rotates together with the first substrate 10a. However, inventive concepts are not limited thereto. For example, when the first charging part 410 does not rotate, the second charging part 440 and the second magnetic part 470 may rotate relative to the first charging part 410. In this case, the first substrate 10a may be omitted. The second magnetic part 470 may rotate together with the second electrode 424 to which the second magnetic part 470 is attached. The second electrode 424 and the second charging part 440 may rotate in interlock with each other.

When the second charging part 440 rotates relative to the first charging part 410, surfaces of the first charging part 410 and the second charging part 440 may intermittently contact each other while slide on each other. The second charging part 440 and the first charging part 410 may include materials having different charging ratings. Therefore, if the surfaces of the second charging part 440 and the first charging part 410 rub together, the surfaces of the second charging part 440 and the first charging part 410 may be charged with different polarities. The types of charges of the first charging part 410 and the second charging part 440 are dependent on materials of the first charging part 410 and the second charging part 440, for example, may be determined by relative positions of the materials of the first charging part 410 and the second charging part 440 in a triboelectric series.

For example, the surface of the first charging part 410 may be charged with a negative charge by friction with the second charging part 440, and the surface of the second charging part 440 may be charged with a positive charge by friction with the first charging part 410. The second charging part 440 may include a conductive material for easy electric connection with the grounding unit 430. The conductive material may include at least one of aluminum (Al), copper (Cu), gold (Au), and steel that are easily charged by friction. In addition, the first charging part 410 may include at least one of polytetrafluoroethylene (Teflon), fluorinated ethylene propylene (FEP), poly(methyl methacrylate) (PMMA), polyvinylidene fluoride (PVDF), polycarbonate (PC), polyvinyl chloride (PVC), polyimide (Kapton), polypropylene (PP), polyethylene (PE), and polystyrene (PS) that are easily charged with a negative charge by friction with the conductive material of the second charging part 440. The first charging part 410 may include an organic polymer such as poly(methyl methacrylate) PMMA, polyethylene terephthalate (PET), polyetheretherketone (PEEK), cycloolefin copolymer (COC), or polytetrafluoroethylene (PTFE). The first charging part 410 may include an inorganic polymer such as polydimethylsiloxane (PDMS) or organically modified ceramic (ORMOCER). The above-listed materials are examples, and inventive concepts are not limited thereto.

In another example, the surface of the first charging part 410 may be charged with a positive charge by friction with the second charging part 440, and the surface of the second charging part 440 may be charged with a negative charge by friction with the first charging part 410. The second charging part 440 may include a conductive material for easy electric connection with the grounding unit 430. The conductive material may include at least one of aluminum (Al), copper (Cu), gold (Au), and steel that are easily charged by friction. The first charging part 410 may include at least one of polyformaldehyde, ethylcellulose, polyamide, melamine formol, wool, silk, mica, and nylon that are easily charged with a positive charge by friction with the conductive material. The above-listed materials are examples, and inventive concepts are not limited thereto.

At least one of the first and second charging parts 410 and 440 may be doped with a p-type dopant or an n-type dopant so as to adjust charging characteristics of the surface thereof. Examples of a source of the p-type dopant may include ionic liquids such as $NO_2BF_4$, $NOBF_4$, or $NO_2SbF_6$; acidic compounds such as HCl, $H_3PO_4$, $CH_3COOH$, $H_2SO_4$, or $HNO_3$; and organic compounds such as dichlorodicyanoquinone (DDQ), oxone, dimyristoylphosphatidylinositol (DMPI), or trifluoromethanesulfoneimide. Other examples of the source of the p-type dopant may include $HPtCl_4$, $AuCl_3$, $HAuCl_4$, AgOTf (silver trifluoromethanesulfonate), $AgNO_3$, $H_2PdCl_6$, $Pd(OAc)_2$, and $Cu(CN)_2$.

Examples of a source of the n-type dopant may include a reduction product of a substituted or unsubstituted nicotinamide; a reduction product of a compound which is chemically bound to a substituted or unsubstituted nicotinamide; and a compound including at least two pyridinium moieties in which a nitrogen atom of at least one of the pyridinium moieties is reduced. For example, the source of the n-type dopant may include nicotinamide mononucleotide-H (NMNH), nicotinamide adenine dinucleotide-H (NADH), nicotinamide adenine dinucleotide phosphate-H (NADPH), or viologen. Alternatively, the source of the n-type dopant may include a polymer such as polyethyleneimine (PEI). Alternatively, the n-type dopant may include an alkali metal such as potassium (K) or lithium (Li). The above-listed p-type dopant materials and n-type dopant materials are examples. That is, any other materials may be used as the p-type dopant and the n-type dopant.

The grounding unit 430 may be electrically connected to the charge reservoir 433. The grounding unit 430 may include a material such as a metal, a ceramic material, or a polymer. The charge reservoir 433 may include ground or a conductive member having substantially no variation in electric potential. The grounding unit 430 may intermittently contact the second charging part 440 while rotating relative to the second charging part 440. When the second charging part 440 contacts the grounding unit 430, the charge reservoir 433 and the second charging part 440 may be electrically connected to each other through the grounding unit 430. When the second charging part 440 is connected to the charge reservoir 433 through the grounding unit 430, the electric potential of the second charging part 440 may become substantially equal to the electric potential of the charge reservoir 433.

The first and second electrodes 422 and 424 may include a material having a high degree of electric conductivity. For example, the first and second electrodes 422 and 424 may include at least one of graphene, carbon nanotube (CNT), indium tin oxide (ITO), a metal, and a conductive polymer. For example, the metal may include at least one of silver (Ag), aluminum (Al), copper (Cu), gold (Au), nickel (Ni), chromium (Cr), and platinum (Pt). However, the metal is not limited thereto. The first and second electrodes 422 and 424 may have a single-layer or multilayer structure.

As the second charging part 440 slides on the surface of the first charging part 410, electrostatic induction may occur between the first and second electrodes 422 and 424. For example, while the contact area between the second charging part 440 and the first charging part 410 varies, a movement of charge may be caused by electrostatic induction between the first and second electrodes 422 and 424. Owing to the electrostatic induction, the triboelectric generator may harvest energy from flow of charge between the first and second electrodes 422 and 424.

While the second charging part 440 rotates relative to the first charging part 410, the second magnetic part 470 may rotate relative to the first magnetic part 460. While the second magnetic part 470 rotates relative to the first magnetic part 460, the distance between the first and second magnetic parts 460 and 470 may vary. For example, the first magnetic part 460 may be attached to a lower surface of the first substrate 10a, and the second magnetic part 470 may be attached to an upper surface of the second electrode 424. However, inventive concepts are not limited thereto.

As the distance between the first and second magnetic parts 460 and 470 varies, the magnitude of magnetic force between the first and second magnetic parts 460 and 470 may vary. The second electrode 424 and the second charging part 440 may contact each other or separate from each other according to the magnitude of magnetic force between the first and second magnetic parts 460 and 470.

In FIGS. 43 to 45, when the distance between the first and second magnetic parts 460 and 470 is relatively small, the second electrode 424 and the second charging part 440 are spaced apart from each other. In this case, the first and second magnetic parts 460 and 470 may repulse each other because mutually-facing surfaces of the first and second magnetic parts 460 and 470 have the same polarity. The second electrode 424 may be spaced apart from the second charging part 440 by repulsive force between the first and second magnetic parts 460 and 470.

However, inventive concepts are not limited thereto. For example, the first and second magnetic parts 460 and 470 may attract each other because the mutually-facing surfaces of the first and second magnetic parts 460 and 470 have different polarities. In this case, when the first and second magnetic parts 460 and 470 approaches each other, the second electrode 424 and the second charging part 440 may contact each other because of attractive force between the first and second magnetic parts 460 and 470. Then, when the first and second magnetic parts 460 and 470 move away from each other, the second electrode 424 may be spaced apart from the second charging part 440. For example, an elastic member may be disposed between the second electrode 424 and the second charging part 440. When the first and second magnetic parts 460 and 470 move away from each other, the second electrode 424 may be spaced apart from the second charging part 440 because of elastic force acting by the elastic member.

Hereinafter, an explanation will be given of how the triboelectric generator described with reference to FIGS. 43 to 45 harvests energy. In the following description, charges illustrated in the drawings are examples. That is, there may be various flows of charge in triboelectric generators of various embodiments.

Figure 46:
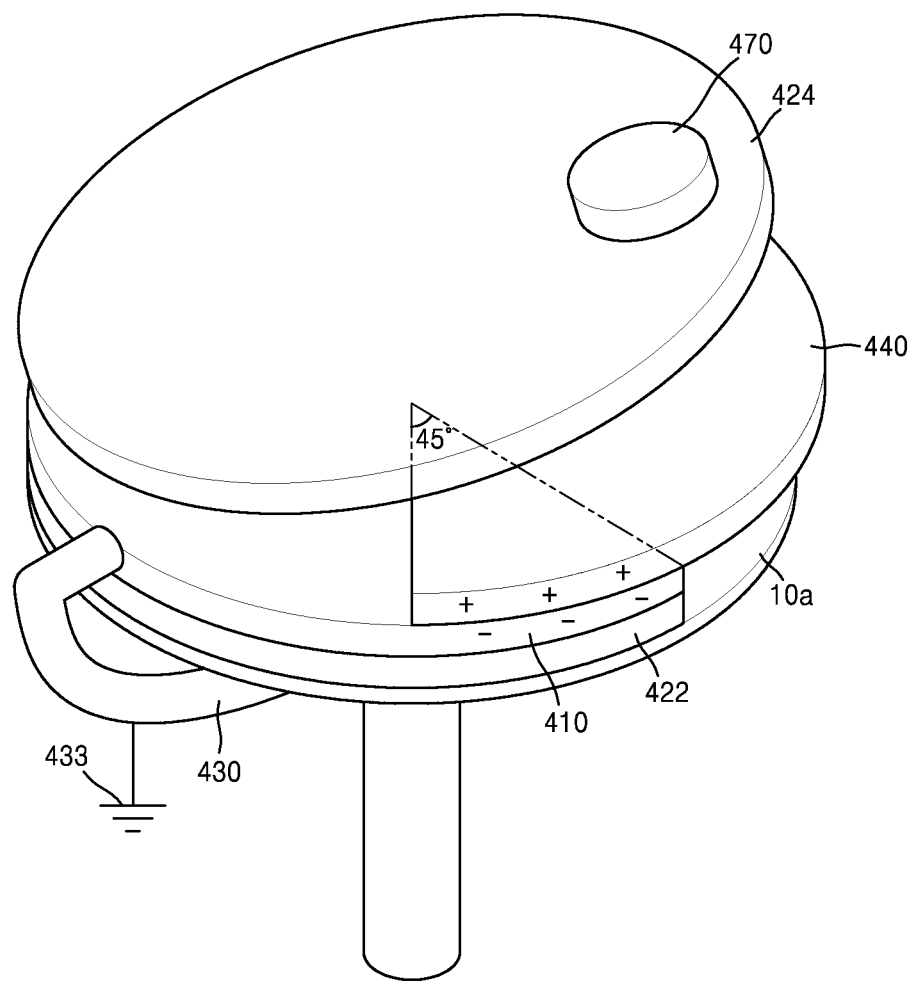
FIG. 46 is a view illustrating a state in which first and second charging parts contact each other as a result of a sliding motion.
Figure 47:
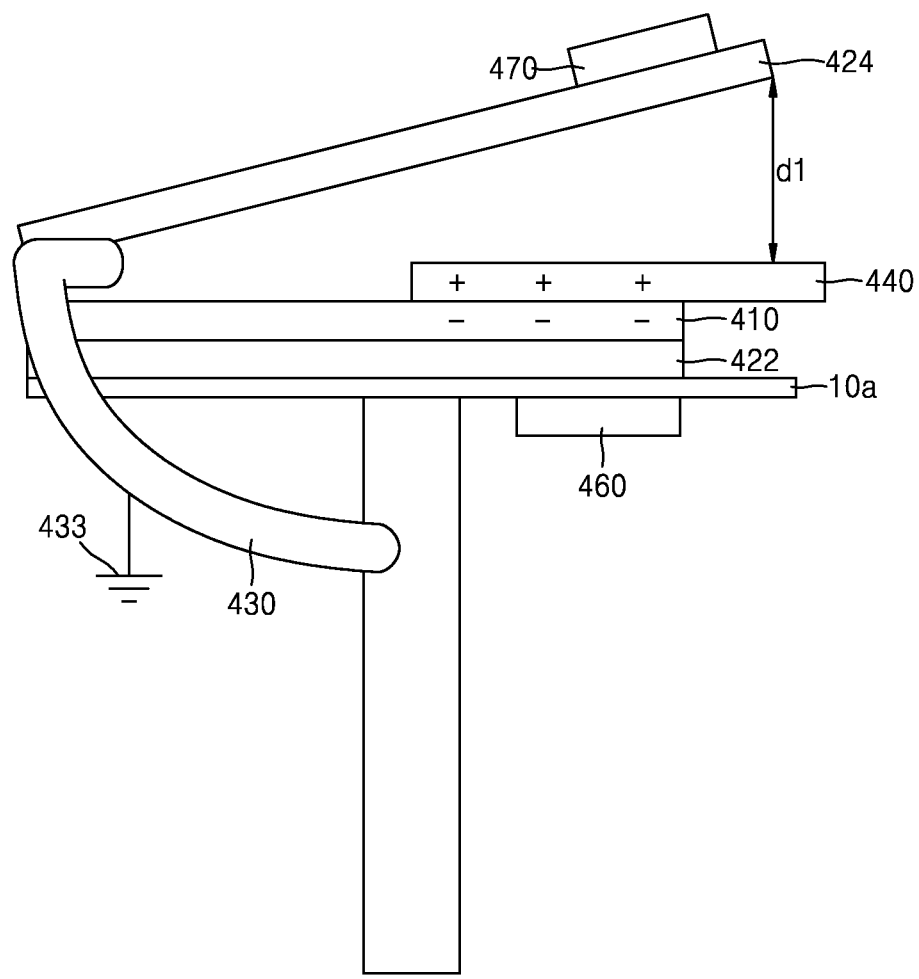
FIG. 47 is a side view illustrating the triboelectric generator shown in FIG. 46.

FIG. 46 is a view illustrating a state in which the first and second charging parts 410 and 440 contact each other through a sliding motion. FIG. 47 is a side view illustrating the triboelectric generator illustrated in FIG. 46, and FIG. 48 is a top view illustrating the triboelectric generator illustrated in FIG. 46.

Figure 48:
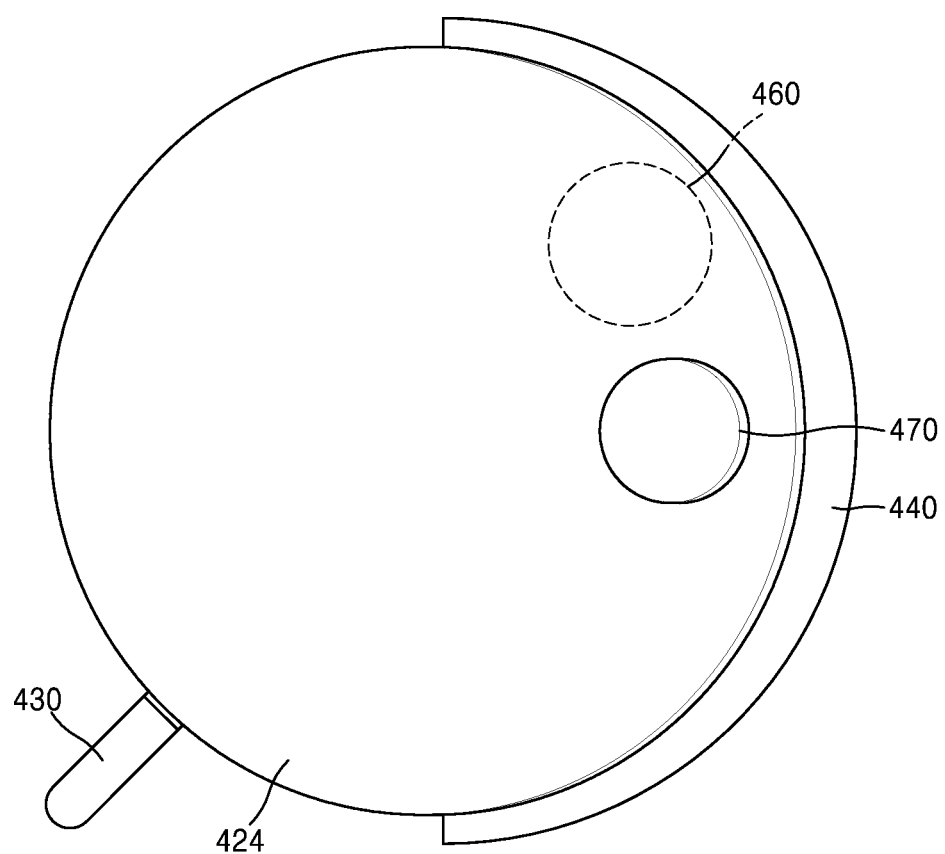
FIG. 48 is a top view illustrating the triboelectric generator shown in FIG. 46.

Referring to FIGS. 46 to 48, the first charging part 410 may move relative to the second charging part 440, and thus the surfaces of the first and second charging parts 410 and 440 may contact each other. When the second charging part 440 slides on the surface of the first charging part 410, tribocharging may occur. For example, when the first and second charging parts 410 and 440 make contact with each other, the surfaces of the first and second charging parts 410 and 440 may be charged with opposite polarities.

Referring to the example shown in FIG. 47, electrons move from the surface of the second charging part 440 to the surface of the first charging part 410 because of friction between the second charging part 440 and the first charging part 410. Owing to the movement of electrons, the second charging part 440 may be charged with a positive charge, and the first charging part 410 may be charged with a negative charge. However, this is merely an example. That is, the opposite case may also be possible. For example, electrons may move from the surface of the first charging part 410 to the surface of the second charging part 440, and thus the first charging part 410 may be charged with a positive charge and the second charging part 440 may be charged with a negative charge.

Referring to FIG. 48, the first and second magnetic parts 460 and 470 may be spaced further apart than shown in FIG. 45. Referring to FIG. 47, as the distance between the first and second magnetic parts 460 and 470 increases, the distance d1 between the second electrode 424 and the second charging part 440 may become less than shown in FIG. 44.

Figure 49:
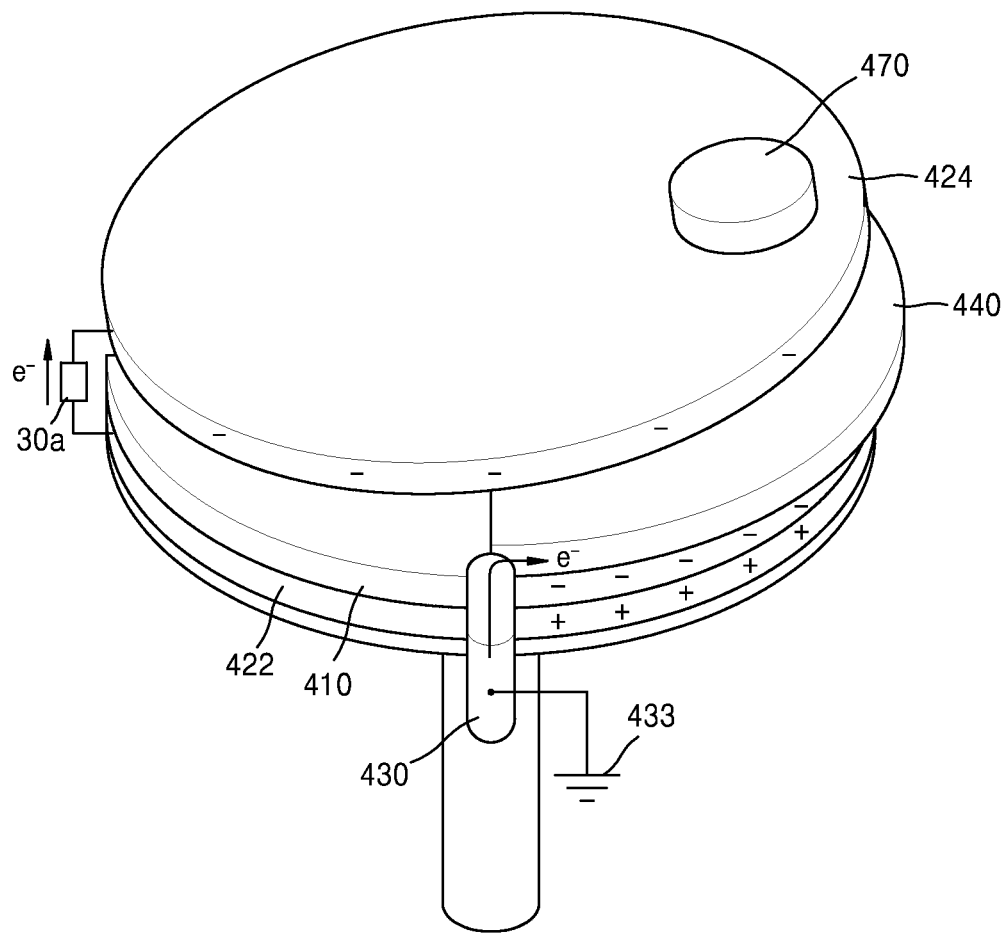
FIG. 49 is a view illustrating a state in which the first charging part is further rotated relative to the second charging part.
Figure 50:
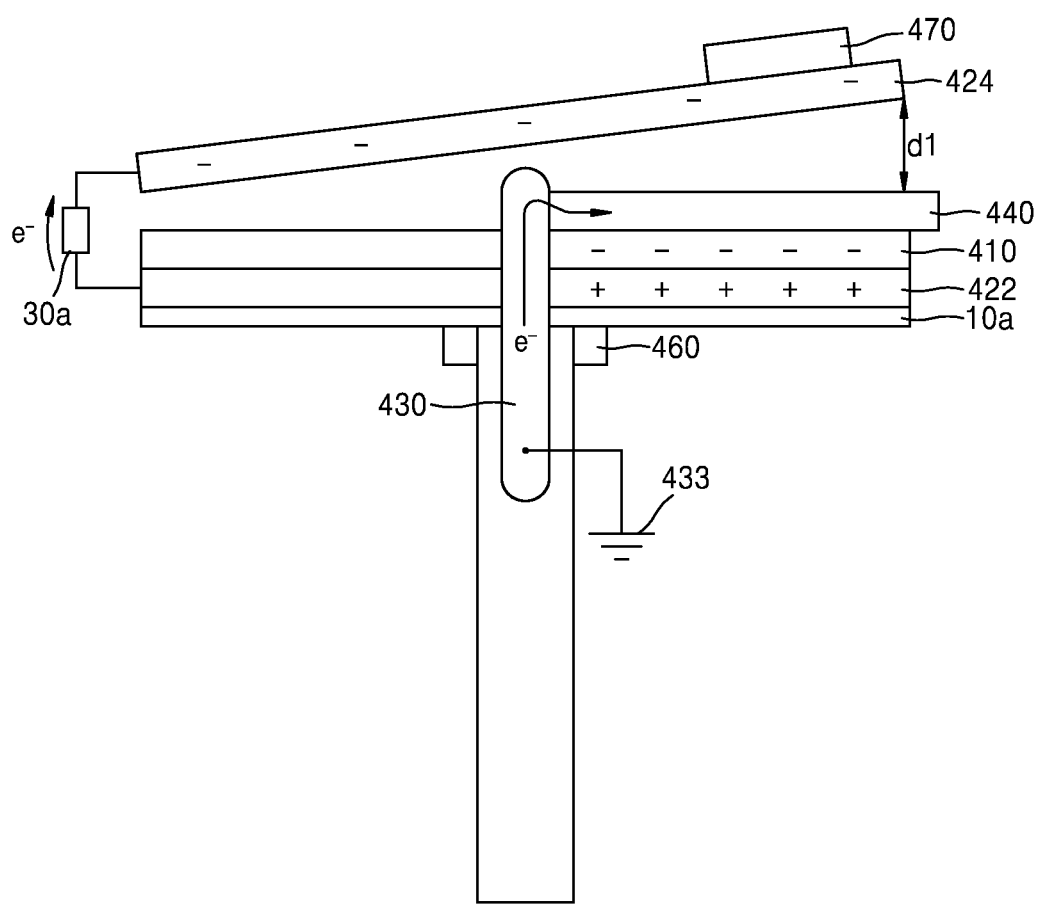
FIG. 50 is a side view illustrating the triboelectric generator shown in FIG. 49.

FIG. 49 is a view illustrating a state in which the first charging part 410 is further rotated relative to the second charging part 440. FIG. 50 is a side view illustrating the triboelectric generator illustrated in FIG. 49, and FIG. 51 is a top view illustrating the triboelectric generator illustrated in FIG. 49.

Figure 51:
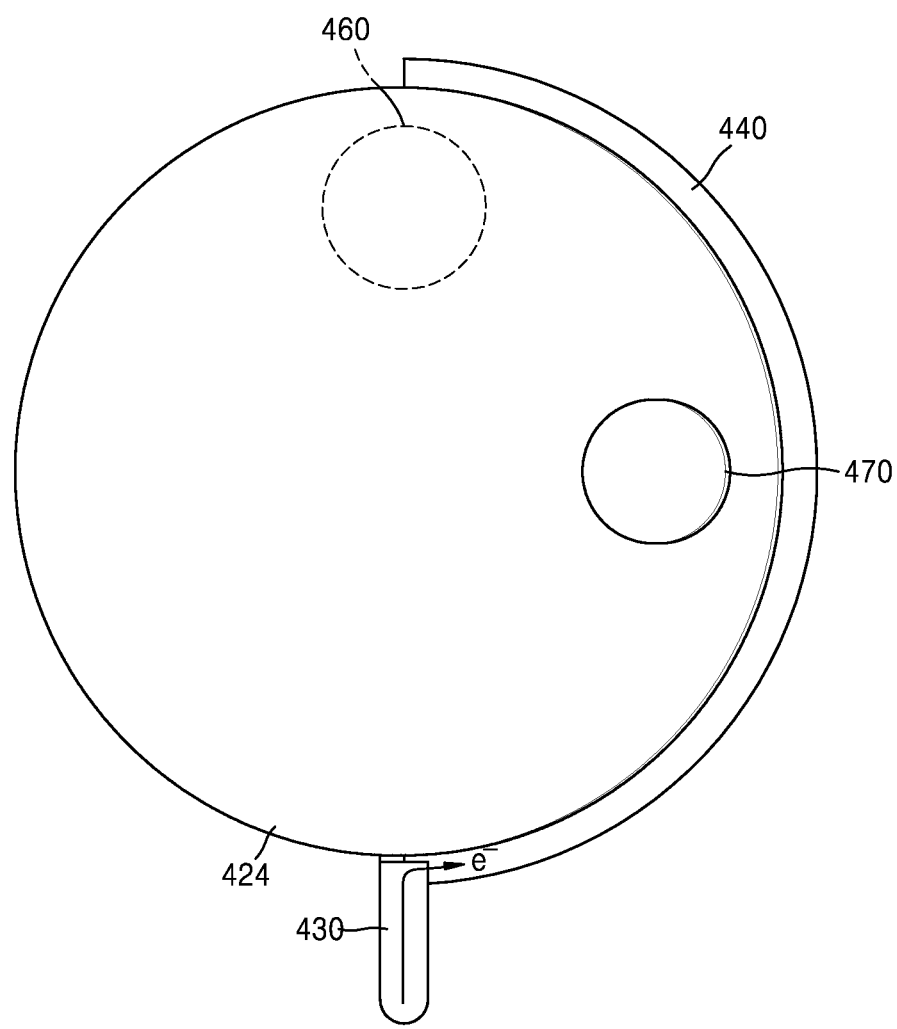
FIG. 51 is a top view illustrating the triboelectric generator shown in FIG. 49.

Referring to FIGS. 49 to 51, as the first charging part 410 rotates relative to the second charging part 440, the contact area between the first and second charging parts 410 and 440 may increase. The grounding unit 430 may rotate together with the first charging part 410 and may contact the second charging part 440. An end portion of the grounding unit 430 may contact an edge of the second charging part 440. When the grounding unit 430 contacts the second charging part 440, the second charging part 440 and the charge reservoir 433 may be electrically connected to each other. The second charging part 440 may exchange charges with the charge reservoir 433. For example, the second charging part 440 may receive electrons from the charge reservoir 433. If the second charging part 440 receives electrons from the charge reservoir 433, the electric potential of the second charging part 440 may become substantially equal to the electric potential of the ground.

When the electric potential of the second charging part 440 varies as electrons are supplied to the second charging part 440, electrostatic induction may occur between the first and second electrodes 422 and 424. For example, electrons may move from the first electrode 422 to the second electrode 424. That is, current may flow between the first and second electrodes 422 and 424. When current flows between the first and second electrodes 422 and 424, electric energy may be harvested from a load 30a connected between the first and second electrodes 422 and 424. Owing to the electrostatic induction, the first electrode 422 may have a relatively large amount of positive charge, and the second electrode 424 may have a relatively large amount of negative charge. Since the second charging part 440 exchanges charges with the charge reservoir 433 through the grounding unit 430, current flowing between the first and second electrodes 422 and 424 may be amplified.

Referring to FIG. 51, the first and second magnetic parts 460 and 470 may be spaced further apart than shown in FIG. 48. As the distance between the first and second magnetic parts 460 and 470 increases, the magnitude of magnetic force between the first and second magnetic parts 460 and 470 may decrease. Referring to FIG. 50, as the magnitude of magnetic force between the first and second magnetic parts 460 and 470 decreases, the distance d1 between the second electrode 424 and the second charging part 440 may decrease.

Figure 52:
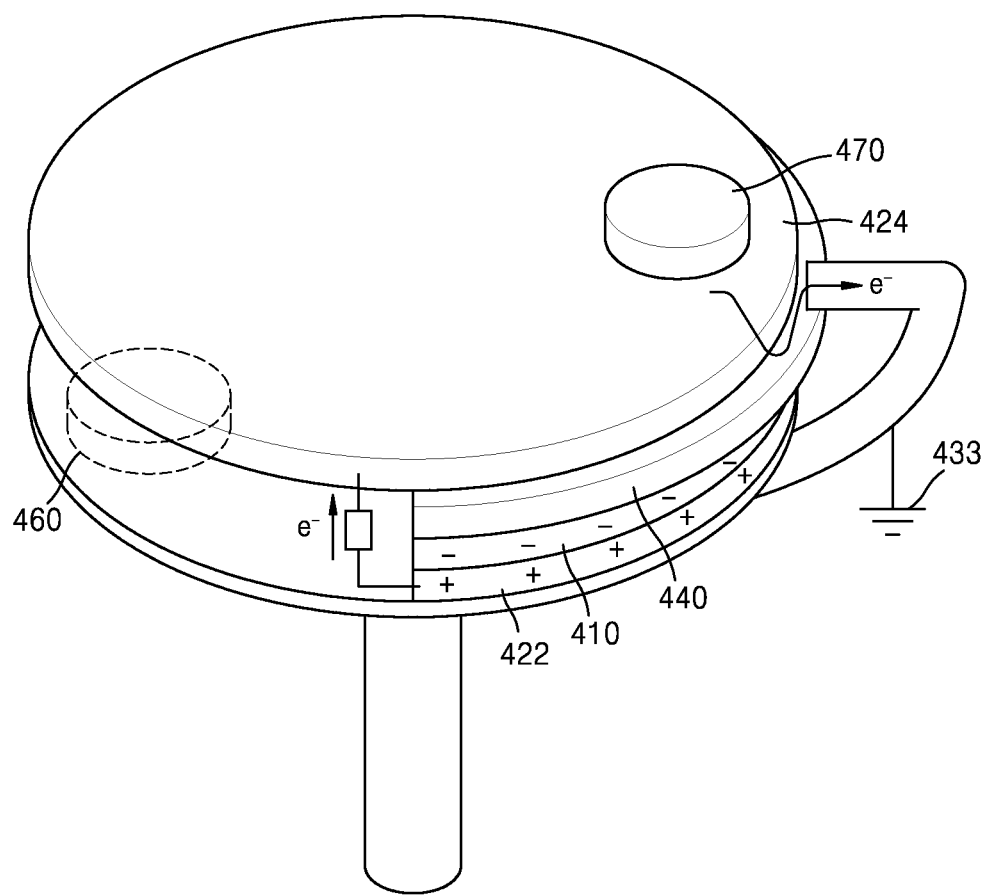
FIG. 52 is a view illustrating a state in which the first charging part is further rotated relative to the second charging part.
Figure 53:
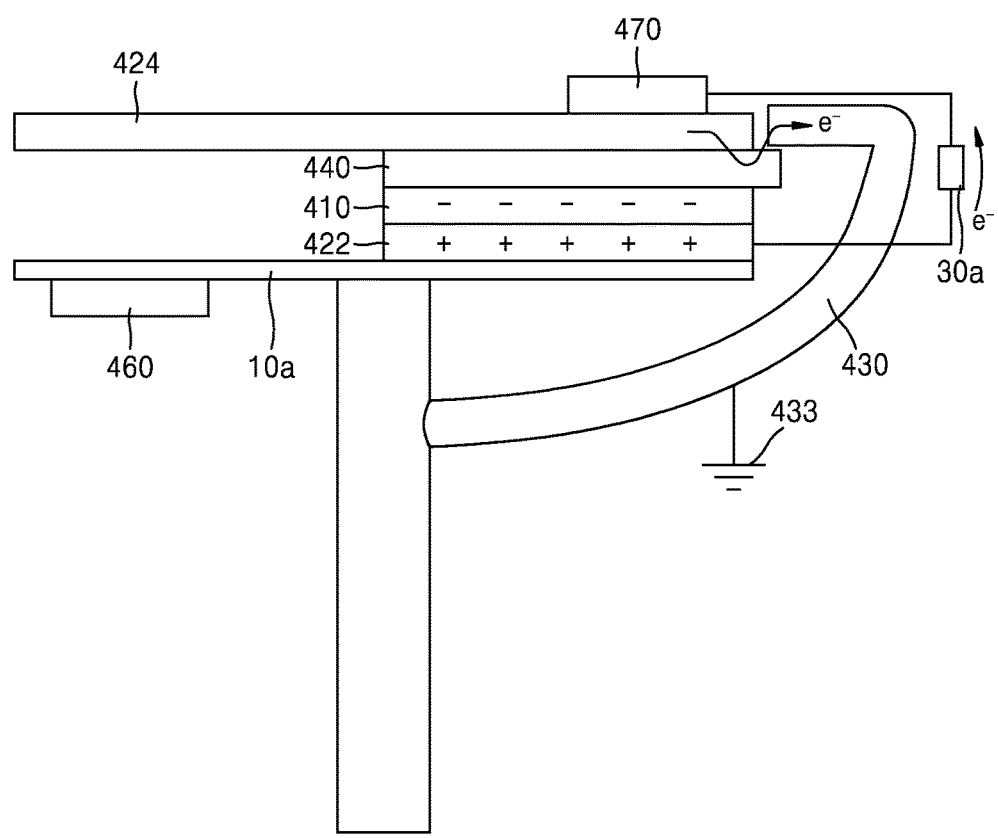
FIG. 53 is a side view illustrating the triboelectric generator shown in FIG. 52.

FIG. 52 is a view illustrating a state in which the first charging part 410 is further rotated relative to the second charging part 440. FIG. 53 is a side view illustrating the triboelectric generator illustrated in FIG. 52, and FIG. 54 is a top view illustrating the triboelectric generator illustrated in FIG. 52.

Figure 54:
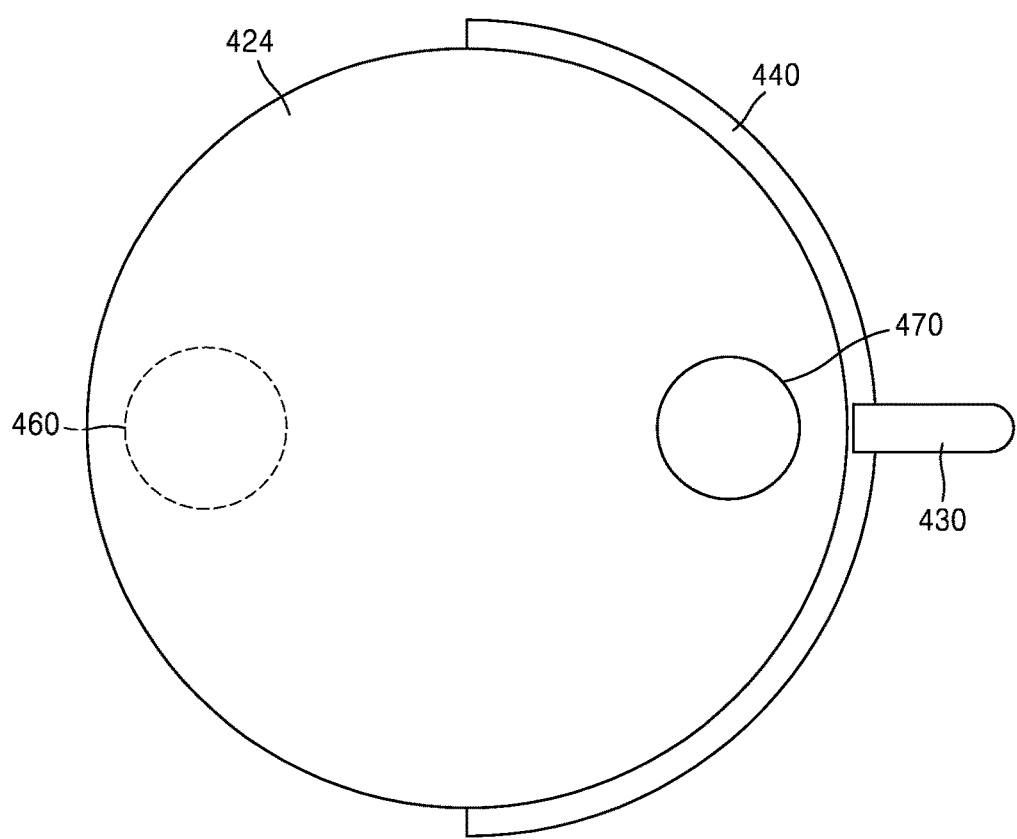
FIG. 54 is a top view illustrating the triboelectric generator shown in FIG. 52.

Referring to FIGS. 52 to 54, as the first charging part 410 rotates relative to the second charging part 440, the contact area between the first and second charging parts 410 and 440 may be maximized. As the contact area between the first and second charging parts 410 and 440 increases, a large amount of negative charge may be induced on the surface of the first charging part 410. While the first charging part 410 rotates relative to the second charging part 440, the end portion of the grounding unit 430 may slide on the edge of the second charging part 440. As electrons move from the charge reservoir 433 to the second charging part 440, the electric potential of the second charging part 440 may become equal to the electric potential of the charge reservoir 433.

As a larger amount of negative charge is induced on the surface of the first charging part 410, electrostatic induction may occur between the first and second electrodes 422 and 424. For example, electrons may move from the first electrode 422 to the second electrode 424. Therefore, in the first electrode 422, the amount of positive charge may be greater than the amount of negative charge.

Referring to FIG. 54, the first and second magnetic parts 460 and 470 may be spaced further apart than shown in FIG. 51. As the distance between the first and second magnetic parts 460 and 470 increases, the magnitude of magnetic force between the first and second magnetic parts 460 and 470 may decrease. Referring to FIG. 52, as the magnitude of magnetic force between the first and second magnetic parts 460 and 470 decreases, the second electrode 424 and the second charging part 440 may contact each other.

If the second electrode 424 contacts the second charging part 440, the second electrode 424 may be electrically connected to the charge reservoir 433 through the second charging part 440 and the grounding unit 430. The second electrode 424 may exchange charges with the charge reservoir 433. The electric potential of the second electrode 424 may become equal to the electric potential of the charge reservoir 433. For example, the electric potential of the second electrode 424 may become substantially equal to the electric potential of the ground.

Electrons may move from the first electrode 422 to the second electrode 424 because of the electrostatic induction between the first and second electrodes 422 and 424. As many electrons as the number of electrons moved from the first electrode 422 to the second electrode 424 may move from the second electrode 424 to the charge reservoir 433. Therefore, the second electrode 424 may be maintained in an electrically neutral state. Since the second electrode 424 is maintained in an electrically neutral state, the amount of current flowing between the first and second electrodes 422 and 424 may be amplified.

Figure 55:
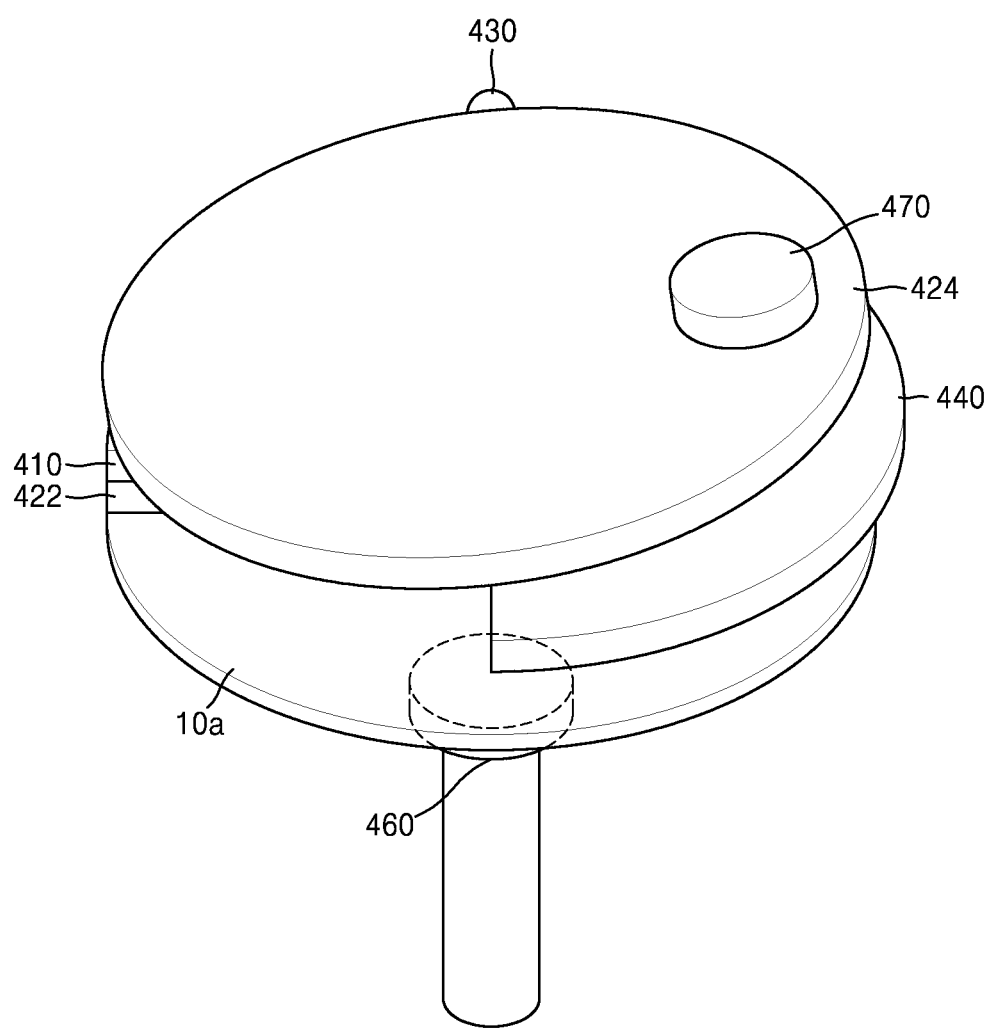
FIG. 55 is a view illustrating a state in which the first charging part is further rotated relative to the second charging part.
Figure 56:
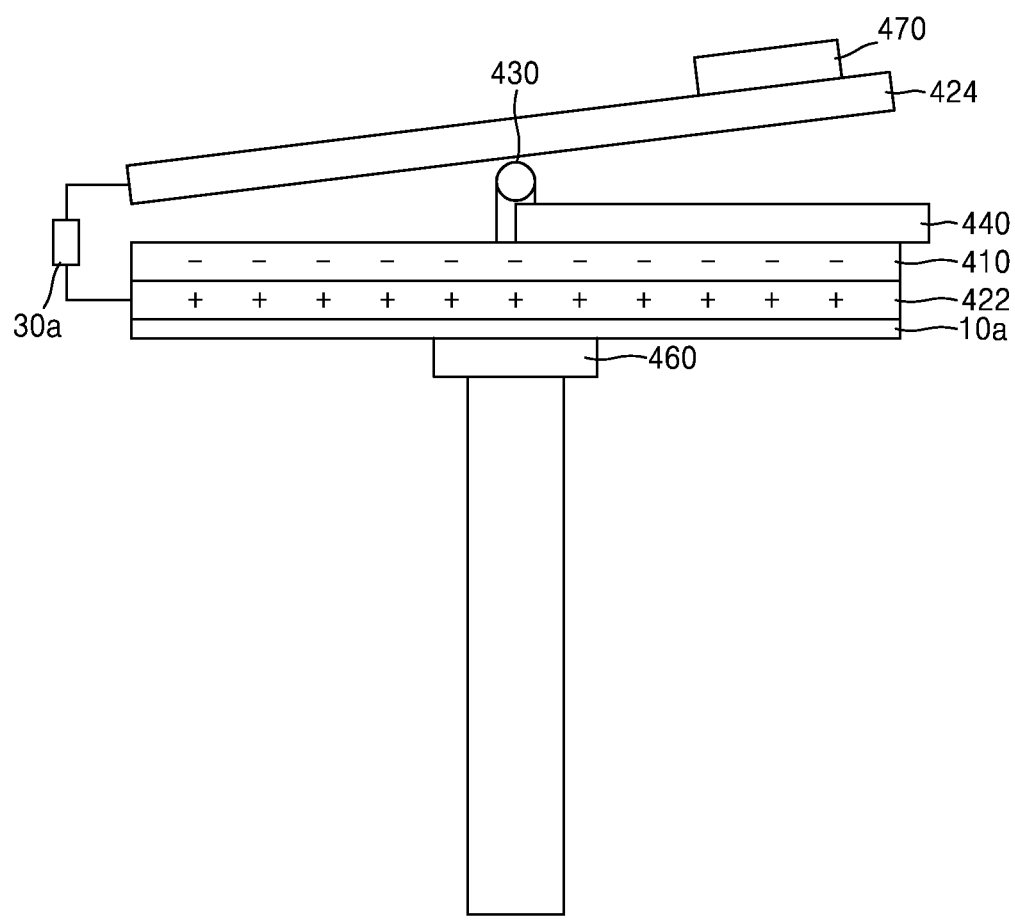
FIG. 56 is a side view illustrating the triboelectric generator shown in FIG. 55.

FIG. 55 is a view illustrating a state in which the first charging part 410 is further rotated relative to the second charging part 440. FIG. 56 is a side view illustrating the triboelectric generator illustrated in FIG. 55, and FIG. 57 is a top view illustrating the triboelectric generator illustrated in FIG. 55.

Figure 57:
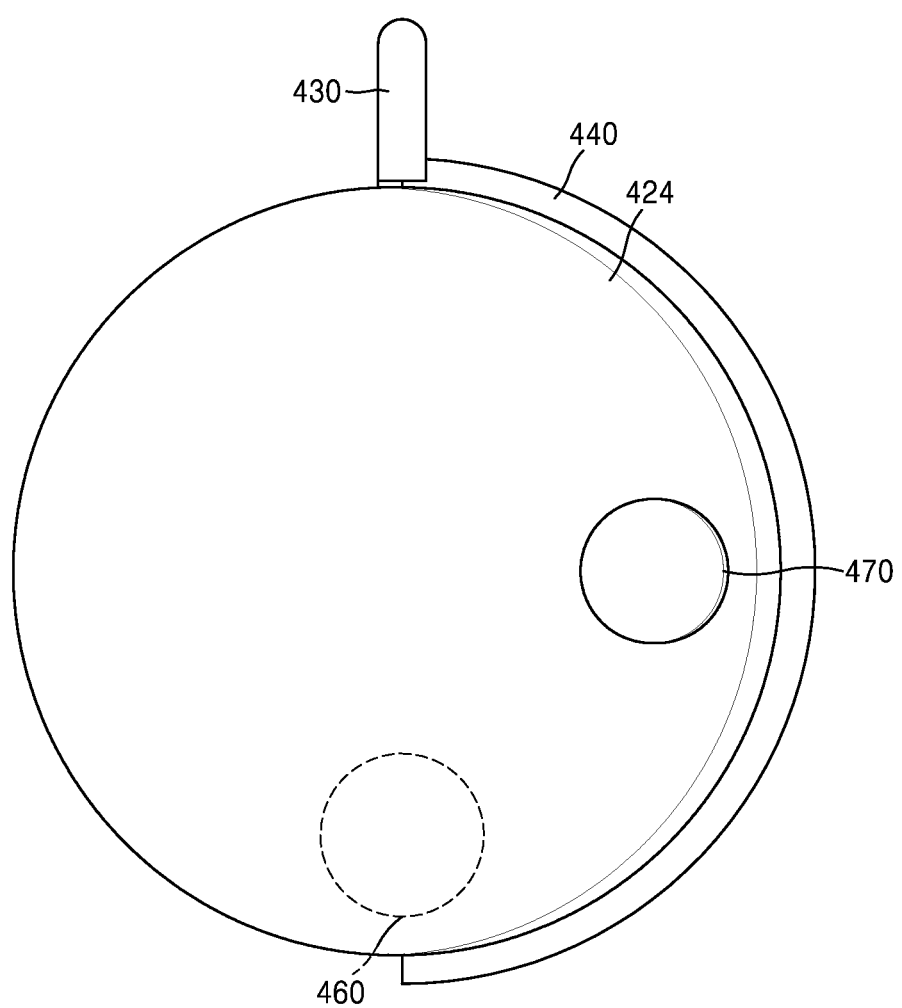
FIG. 57 is a top view illustrating the triboelectric generator shown in FIG. 55.

Referring to FIGS. 55 to 57, as the first charging part 410 rotates relative to the second charging part 440, the contact area between the first and second charging parts 410 and 440 may decrease. In addition, as shown in FIG. 57, since the distance between the first and second magnetic parts 460 and 470 decreases, the second electrode 424 and the second charging part 440 may be separated from each other. As shown in FIG. 57, the end portion of the grounding unit 430 may be at a position just before separation from the second charging part 440.

If the first charging part 410 rotates further in the state shown in FIGS. 55 to 57, the first charging part 410 may return to the initial position shown in FIGS. 43 to 45. If the first charging part 410 returns to the initial position, there may be no movement of charge because of electrical equilibrium.

After the cycle described with reference to FIGS. 46 to 57, the first charging part 410 may be maintained in a negatively charged state unlike the state shown in FIGS. 43 to 45. If relative rotation between the first and second charging parts 410 and 440 is continued, the processes described with reference to FIGS. 46 to 57 may be repeated in the state in which the first charging part 410 is negatively charged. While the cycle is repeated, current may flow between the first and second electrodes 422 and 424 owing to electrostatic induction. While the second charging part 440 intermittently contacts the charge reservoir 433, the second charging part 440 may exchange charges with the charge reservoir 433. Since the second charging part 440 exchanges charges with the charge reservoir 433, current flowing between the first and second electrodes 422 and 424 may be amplified.

Figure 58:
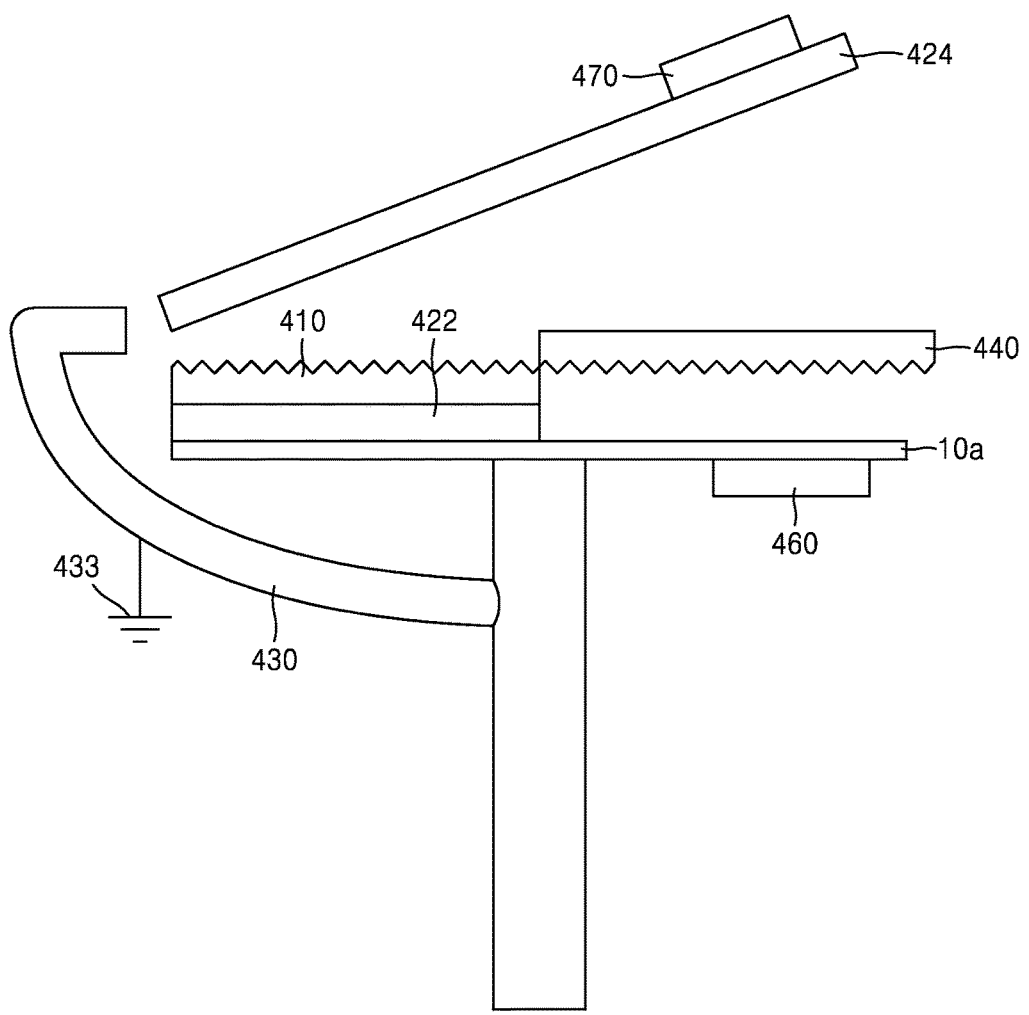
FIG. 58 is a view illustrating a modification of the triboelectric generator shown in FIG. 44.

FIG. 58 is a view illustrating a modification of the triboelectric generator shown in FIG. 44. In the following description with reference to FIG. 58, the same descriptions as those given above with reference to FIGS. 43 and 57 will not be repeated.

Referring to FIG. 58, a plurality of protrusions may be formed on at least one of a contact surface of a first charging part 410 and a contact surface of a second charging part 440. The protrusions may include nano-pyramids, nano-wires, nano-balls, nano-rods, or the like. Since the protrusions are formed on at least one of the contact surface of the first charging part 410 and the contact surface of the second charging part 440, when the first charging part 410 and the second charging part 440 contact each other, the amount of charge induced on each of the contact surface of the first charging part 410 and the contact surface of the second charging part 440 may be increased.

Figure 59:
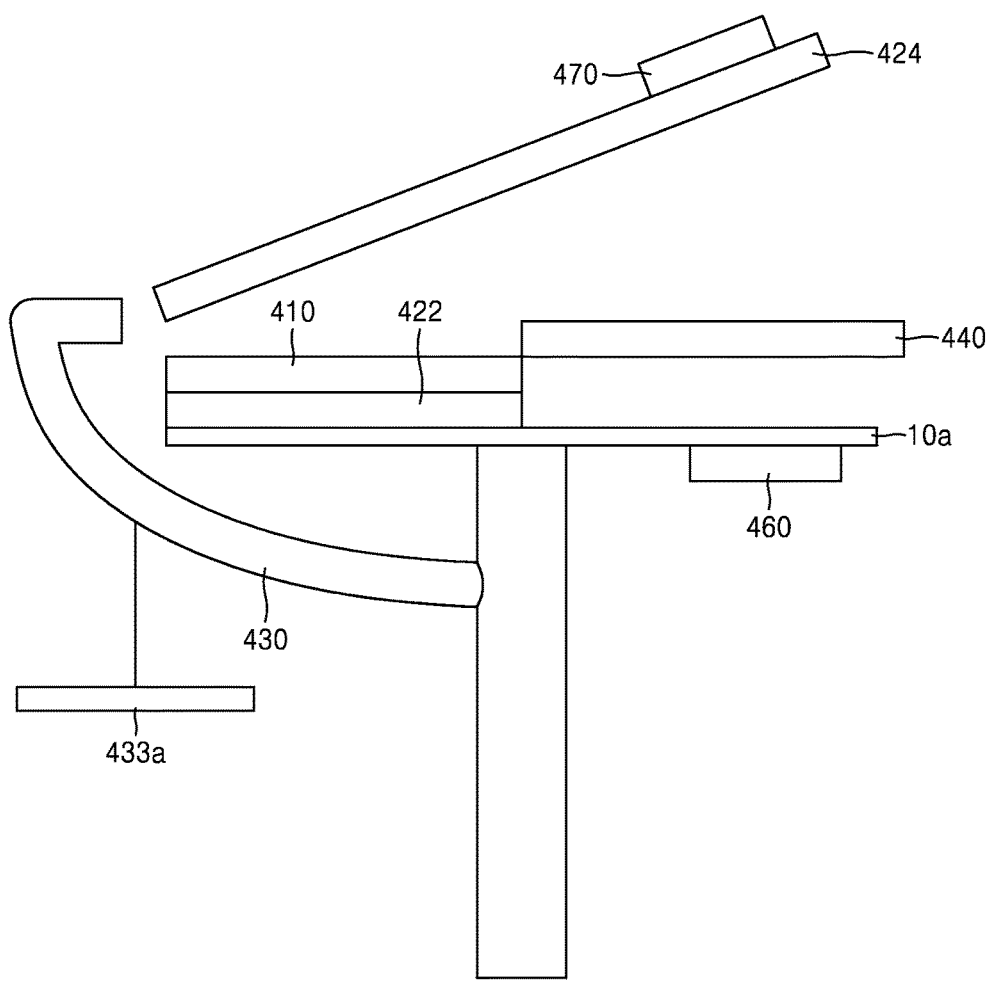
FIG. 59 is a view illustrating a modification of the triboelectric generator shown in FIG. 44.

FIG. 59 is a view illustrating a modification of the triboelectric generator shown in FIG. 44.

Referring to FIG. 59, a charge reservoir 433a may include a conductive member. In FIG. 59, the conductive member has a plate shape. However, this is an example, and the conductive member is not limited thereto. The charge reservoir 433a may be a conductive member having a high degree of capacity. When the charge reservoir 433a is connected to a second charging part 440 through a grounding unit 430, the charge reservoir 433a may exchange charges with the second charging part 440. That is, as the charge reservoir 433a exchanges charges with the second charging part 440, the electric potential of the second charging part 440 may become equal to the electric potential of the charge reservoir 433a. For example, the electric potential of the charge reservoir 433a may be substantially the same as the electric potential of ground.

Figure 60:
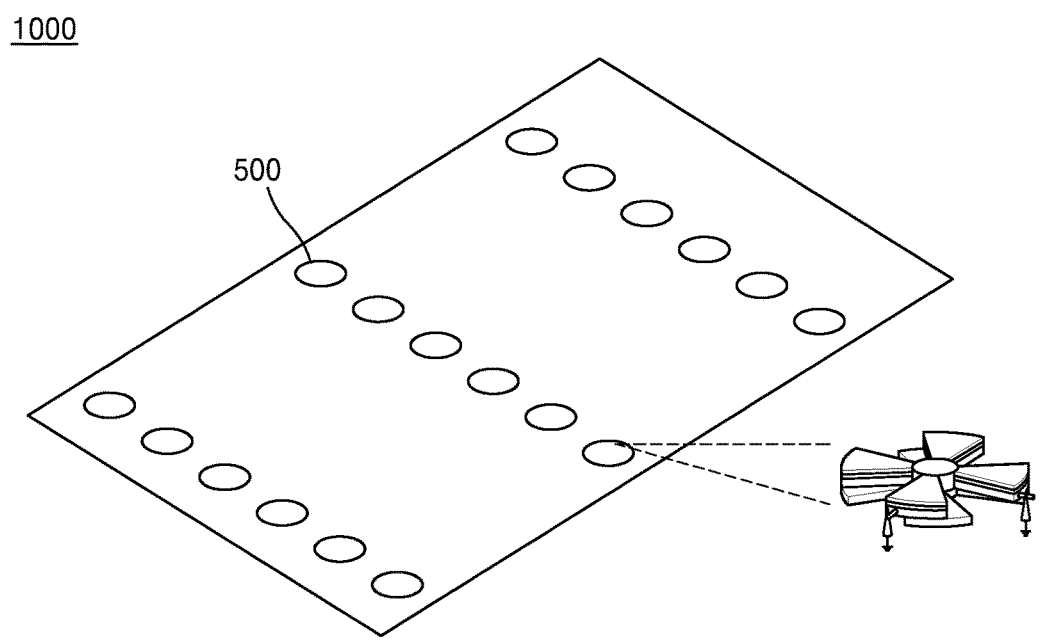
FIG. 60 is a view illustrating a triboelectric system according to some example embodiments.

FIG. 60 is a view illustrating a triboelectric system according to some example embodiments.

Referring to FIG. 60, a triboelectric system 1000 may include a plurality of triboelectric generators 500. The triboelectric generators 500 may be arranged in an array on a substrate and may be electrically connected to a common circuit. The substrate may be in polygonal shape, but inventive concepts are not limited thereto. The triboelectric generators 500 may be exposed to wind. As such, the triboelectric system 1000 may be useful to place on structures where environmental wind may rotate the triboelectric generator. For example, the triboelectric system 1000 may be useful on an external surface of a building and/or an external surface (e.g., the roof) of a vehicle, but inventive concepts are not limited thereto. As a non-limiting example, the triboelectric generator 500 in FIG. 60 may include the triboelectric generator discussed with reference to FIG. 23, but inventive concepts are not limited thereto. Any one of the triboelectric generators described above with reference to FIGS. 1 to 59 may be used as one of the triboelectric generators 500. Also, the triboelectric generators 500 in the triboelectric system may all be the same, or some of the triboelectric generators 500 may be different other triboelectric generators 500 in the triboelectric system 1000.

Figure 61:
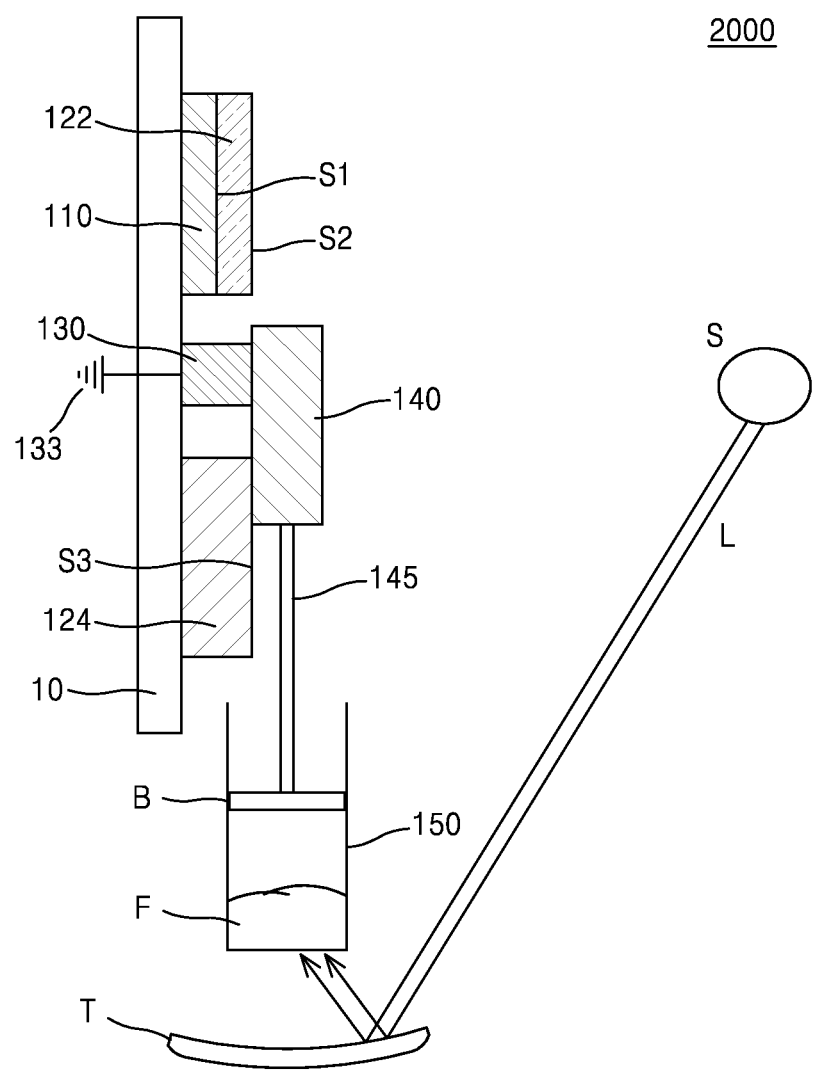
FIG. 61 is a view illustrating a triboelectric system according to some example embodiments.

FIG. 61 is a view illustrating a triboelectric system according to some example embodiments.

Referring to FIG. 61, a triboelectric system 2000 may include a triboelectric generator arranged (see e.g., triboelectric generator described in FIG. 2) arranged over a piston container 150 and a trough T (or other reflecting mirror). The piston container 150 may be positioned between a side of the second charging structure 140 and the trough T (other reflecting mirror). The trough T (other reflecting mirror) may reflect light L from the sun S (and/or other light source) to heat a fluid F in the piston container 150. The light L may also increase a temperature of the piston container 150 and the piston container 150 may transfer thermal energy to the fluid F. As the light energy L heats the fluid F in the piston container 150, part of the fluid may volatilize and push the base B of the piston 145 upward to move the second charging structure 140 in a vertical direction; consequently, the second charging structure 140 may slide along the second electrode 124, grounding unit 130, and first charging structure 122. When the fluid F cools down, the second charging structure 140 may lower back toward the piston container 150. The base B may be configured to move with minimal friction up and down in the piston container 150. In other words, as the fluid F heats up and volatizes, the volume expansion of the fluid may push the piston 145 upward and move the second charging structure 140 upward. Also, as the temperature of the fluid F decreases, the volume of the fluid may decrease as the fluid F changes from a gas to a liquid; thus, the piston 145 may no longer push the second electrode 124 up and the second electrode 124 may lower towards the piston container 150.

Triboelectric generators according to some example embodiments have been described with reference to FIGS. 1 to 59, and triboelectric systems according to some example embodiments have been described with reference to FIGS. 60-61. According to the one or more of the above embodiments, the first and second charging parts may contact each other and may be charged with different polarities. In addition, current may flow between the first and second electrodes when the first and second charging parts move relative to each other. Electric energy may be harvested from current flowing between the first and second electrodes. In addition, the electric potential of the second charging part or the second electrode may vary as the grounding unit intermittent contacts the second charging part or the second electrode, and thus the amount of current flowing between the first and second electrodes may be amplified.

Any one of the above-described triboelectric generators may be included as an electricity supply unit in a device such as a smartwatch, a cellular phone, a radio, a biosensor, a position sensor, a body temperature sensor, a blood pressure sensor, or another triboelectric system. In addition, any one of the above-described triboelectric generators may be included in a mobile device configured for attachment to a body part that almost always moves, such as the hands or legs, so as to convert kinetic energy of the hands or legs into electric energy. In addition, any one of the above-described triboelectric generators may be included a machine to convert vibrational energy into electric energy. Furthermore, the triboelectric generators may be used to generate electric energy using vibration caused by wind, pressure, sound, or fluid flow.

It should be understood that example embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A triboelectric generator comprising:
a first electrode and a second electrode spaced apart from each other;
a first charging part and a second charging part,
the first charging part being on the first electrode,
the first charging part being configured to be charged a first polarity due to contact with the second charging part,
the second charging part being configured to slide on a surface of the first charging part,
the second charging part being configured to be charged with a second polarity that is opposite to the first polarity through contact with the first charging part; and
a grounding unit configured to intermittently connect the second charging part to a charge reservoir according to movement of the second charging part, and
wherein the second charging part is configured to slide on a surface of the second electrode as well as on the surface of the first charging part.

2. The triboelectric generator of claim 1, wherein the first electrode and the second electrode are spaced apart from each other in a direction in which the second charging part is configured to slide.

3. The triboelectric generator of claim 2, wherein
the first charging part is on an upper surface of the first electrode, and
the upper surface of the first electrode faces the second charging part.

4. The triboelectric generator of claim 1, wherein
the grounding unit is between the first electrode and the second electrode, and
the second charging part is configured to slide on an upper surface of the grounding unit.

5. The triboelectric generator of claim 4, wherein
a distance between the first charging part and the grounding unit is less than a width of the second charging part, and
a distance between the second electrode and the grounding unit is less than the width of the second charging part.

6. The triboelectric generator of claim 5, further comprising:
a first substrate, wherein
the first electrode, the grounding unit, and the second electrode are on the first substrate.

7. The triboelectric generator of claim 6, wherein the first substrate has a cylindrical shape or a circular post shape.

8. The triboelectric generator of claim 7, further comprising:
a second substrate having a cylindrical shape surrounding the first substrate, wherein
the second charging part is on an inner surface of the second substrate.

9. The triboelectric generator of claim 6, wherein
the first substrate has a circular plate shape, and
the first electrode, the grounding unit, and the second electrode are arranged on the first substrate in radial directions.

10. The triboelectric generator of claim 9, further comprising:
a second substrate having a circular plate shape facing the first substrate, wherein
the second charging part is on the second substrate.

11. The triboelectric generator of claim 1, wherein the charge reservoir includes a ground or a conductive member.

12. A triboelectric generator comprising:
a first electrode;
a first charging part on the first electrode, the first charging part having a first charging rating, the first charging part including a first material;
a second electrode spaced apart from the first electrode;
a second charging part configured to contact a surface of the first charging part through sliding motion,
the second charging part being configured to contact a surface of the second electrode through sliding motion,
the second charging part having a second charging rating that is different than the first charging rating,
the second charging part including an electrically conductive material that is different than the first material; and
a grounding unit configured to intermittently connect the second charging part to a charge reservoir according to movement of the second charging part.

13. The triboelectric generator of claim 12, wherein
the grounding unit is between the first electrode and the second electrode, and
the second charging part is configured to slide on an upper surface of the grounding unit.

14. The triboelectric generator of claim 12, wherein
the first charging part includes at least one of an organic polymer, an inorganic polymer, and an organically modified ceramic, and
the second charging part includes a metallic material.

15. A triboelectric generator comprising:
a first electrode and a second electrode spaced apart from each other;
a first charging part and a second charging part,
the first charging part being on the first electrode,
the first charging part being configured to be charged a first polarity due to contact with the second charging part,
the second charging part being configured to slide on a surface of the first charging part, the second charging part being configured to be charged with a second polarity that is opposite to the first polarity through contact with the first charging part; and a grounding unit configured to intermittently connect the second charging part to a charge reservoir according to movement of the second charging part, wherein the grounding unit is between the first electrode and the second electrode, and the second charging part is configured to slide on an upper surface of the grounding unit.

* * * * *